US010833379B2

(12) United States Patent
Scaringe et al.

(10) Patent No.: US 10,833,379 B2
(45) Date of Patent: Nov. 10, 2020

(54) ELECTRIC VEHICLE WITH MODULAR REMOVABLE AUXILIARY BATTERY WITH INTEGRATED COOLING

(71) Applicant: Rivian IP Holdings, LLC, Plymouth, MI (US)

(72) Inventors: Robert J. Scaringe, Plymouth, MI (US); Charles Chang, Coto De Caza, CA (US); Henry Huang, Ann Arbor, MI (US); Patrick Hunt, Evanston, IL (US)

(73) Assignee: Rivian IP Holdings, LLC, Plymouth, MI (US)

( * ) Notice: Subject to any disclaimer, the term of this patent is extended or adjusted under 35 U.S.C. 154(b) by 70 days.

(21) Appl. No.: 16/032,594

(22) Filed: Jul. 11, 2018

(65) Prior Publication Data

US 2019/0016231 A1 Jan. 17, 2019

Related U.S. Application Data

(60) Provisional application No. 62/531,847, filed on Jul. 12, 2017.

(51) Int. Cl.
*H01M 10/6556* (2014.01)
*B60L 58/26* (2019.01)
(Continued)

(52) U.S. Cl.
CPC ......... *H01M 10/6556* (2015.04); *B60L 1/003* (2013.01); *B60L 1/02* (2013.01);
(Continued)

(58) Field of Classification Search
None
See application file for complete search history.

(56) References Cited

U.S. PATENT DOCUMENTS 8,047,316 B2 11/2011 Takami et al.
8,471,521 B2 6/2013 Stewart et al.
(Continued)

FOREIGN PATENT DOCUMENTS

FR 3001341 A1 7/2014

OTHER PUBLICATIONS

International Search Report and Written Opinion of the International Searching Authority for corresponding PCT Application No. PCT/US2018/041601, dated Nov. 7, 2018, 12 pages.
(Continued)

*Primary Examiner* — Scott J. Chmielecki
(74) *Attorney, Agent, or Firm* — Clements Bernard Walker

(57) ABSTRACT

An electric vehicle system for transporting human passengers or cargo includes an electric vehicle that includes a body, a plurality of wheels, a cargo area, an electric motor for propelling the electric vehicle, and a primary battery for providing electrical power to the electric motor for propelling the electric vehicle. An auxiliary battery module is attachable to the electric vehicle for providing electrical power to the electric motor via a first electrical connector at the auxiliary battery module and a second electrical connector at the electric vehicle that mates with the first electrical connector. The auxiliary battery module can be positioned in the cargo area while supplying power to the electric motor, and can be removable and reattachable from the electric vehicle. The auxiliary battery module includes an integrated cooling system for cooling itself during operation of the electric vehicle including a conduit therein for circulating coolant.

11 Claims, 14 Drawing Sheets

(51) Int. Cl.
| | |
|---|---|
| *H01M 10/625* | (2014.01) |
| *H01M 10/613* | (2014.01) |
| *B60L 1/00* | (2006.01) |
| *B60L 50/60* | (2019.01) |
| *B60L 1/02* | (2006.01) |
| *H01M 10/48* | (2006.01) |
| *H01M 10/6554* | (2014.01) |
| *H01M 2/30* | (2006.01) |
| *B60L 50/64* | (2019.01) |
| *H01M 10/63* | (2014.01) |
| *H01M 10/6568* | (2014.01) |

(52) U.S. Cl.
CPC ............... *B60L 50/64* (2019.02); *B60L 50/66* (2019.02); *B60L 58/26* (2019.02); *H01M 2/305* (2013.01); *H01M 10/486* (2013.01); *H01M 10/613* (2015.04); *H01M 10/625* (2015.04); *H01M 10/63* (2015.04); *H01M 10/6554* (2015.04); *H01M 10/6568* (2015.04); *B60L 2240/545* (2013.01); *H01M 2220/20* (2013.01)

(56) References Cited

U.S. PATENT DOCUMENTS

| | | | |
|---|---|---|---|
| 9,290,100 B2 | 3/2016 | Wisniewski et al. | |
| 9,680,190 B1* | 6/2017 | Xia | H01M 10/615 |
| 10,476,051 B2* | 11/2019 | Mardall | H01M 2/1083 |
| 2011/0084664 A1* | 4/2011 | White | B60L 53/14 |
| | | | 320/134 |
| 2014/0084832 A1* | 3/2014 | Sato | H01M 10/625 |
| | | | 318/452 |
| 2015/0251520 A1* | 9/2015 | Andrews | B60H 1/00921 |
| | | | 62/79 |
| 2016/0104922 A1* | 4/2016 | Hoefler | B60L 58/26 |
| | | | 429/120 |
| 2016/0276719 A1* | 9/2016 | Kikuchi | B60L 58/26 |
| 2016/0372805 A1* | 12/2016 | Kim | H01M 10/6568 |
| 2017/0001493 A1* | 1/2017 | Graaf | B60H 1/323 |
| 2017/0012324 A1* | 1/2017 | Giordano | H01M 10/613 |
| 2017/0033337 A1 | 2/2017 | O'Hora | |
| 2017/0033408 A1* | 2/2017 | O'Hora | H01M 10/441 |
| 2017/0106724 A1* | 4/2017 | Porras | B60H 1/00385 |
| 2017/0110775 A1* | 4/2017 | Smith | F25B 21/04 |
| 2017/0125861 A1* | 5/2017 | Machida | H01M 10/625 |
| 2017/0133722 A1* | 5/2017 | Kim | H01M 10/441 |
| 2017/0152957 A1* | 6/2017 | Roche | H01M 10/6568 |
| 2017/0271727 A1* | 9/2017 | Ito | H01M 10/667 |
| 2018/0086224 A1 | 3/2018 | King | |
| 2018/0301919 A1* | 10/2018 | Rumbaugh | H01M 10/625 |
| 2018/0370013 A1* | 12/2018 | Munevar | H01M 10/613 |

OTHER PUBLICATIONS

Modular Range Extender Options, Tesla Forums, Jun. 3-8, 2016, 11 pages, retrieved from the Internet at https://forums.tesla.com/forum/forums/modular-range-extender-options-0 on Apr. 18, 2019.

Rinspeed presents innovative "Dock+Go" mobility system at the Geneva Motor Show: Backpacks on Wheels for Electric Vehicles, Rinspeed AG, 2012, 16 pages, retrieved from the Internet at https://www.rinspeed.eu/en/DockGo_26_concept-car.html#mehrlesen on Apr. 18, 2019.

* cited by examiner

ELECTRIC VEHICLE WITH MODULAR REMOVABLE AUXILIARY BATTERY WITH INTEGRATED COOLING

This application claims the benefit of U.S. Provisional Patent Application No. 62/531,847 filed Jul. 12, 2017, the entire contents of which are incorporated herein by reference.

BACKGROUND

Field of the Disclosure

The present disclosure relates to vehicles, such as electric vehicles including hybrid vehicles, and more particularly to an auxiliary battery system for electric vehicles.

Background Information

Electric automotive vehicles are of great interest for transportation applications and can provide benefits of low or zero emissions, quiet operation and reduced dependence upon fossil fuels. However, the range of typical electrical vehicles may be insufficient for some uses. The present inventors have observed a need for an improved approach for providing extended range for electric automotive vehicles.

SUMMARY

The present inventors have observed a need for an auxiliary battery system for an electric automotive vehicle to increase the range of the electric vehicle, and in particular, an auxiliary battery system that can be carried by the electric vehicle, e.g., in a cargo area of the electric vehicle, and that can be efficiently cooled. The present disclosure describes an exemplary electric vehicle system including an electric vehicle and an auxiliary battery module that can be easily attached to, removed from and reattached to the electric vehicle as desired, and that can be cooled by sharing coolant of the electric vehicle's cooling system that cools the vehicle's primary powertrain electric battery. For example, liquid coolant such as ethylene glycol can be circulated through cooling lines (conduits) in the primary powertrain battery and through cooling lines in the auxiliary battery module to cool both the primary battery and the auxiliary battery, wherein, e.g., the liquid coolant for the primary power train battery and the liquid coolant for the auxiliary battery module are both cooled by a shared heat exchanger that exchanges heat between the coolant and a refrigerant. The present disclosure also describes an exemplary electric vehicle system including an electric vehicle and an auxiliary battery module that can be easily attached to, removed from and reattached to the electric vehicle as desired, and that includes its own separate and distinct refrigerant-based cooling system. When outfitted with the auxiliary battery, the electric vehicle can detect the fact that the auxiliary battery is attached to (e.g., mounted in) the electric vehicle (e.g., in cargo bed) and automatically set one of multiple predetermined feature sets, e.g., that pertain to driving performance of the electric vehicle. Such feature sets may set, for example, certain suspension characteristics appropriate for the attachment of the auxiliary battery, such as, e.g., a setting for firmness of ride of the vehicle, braking performance/sensitivity, nominal suspension height, effective steering ratio, etc. Exemplary approaches described herein may provide for both integrated cooling of the auxiliary battery and adjustment of settings that govern the ride performance of the electric vehicle when the auxiliary battery module is attached to (e.g., mounted in) the electric vehicle.

According to an example, an electric vehicle system for transporting human passengers or cargo includes an electric vehicle that includes a body, a plurality of wheels, a cargo area, an electric motor for propelling the electric vehicle, and a primary battery for providing electrical power to the electric motor for propelling the electric vehicle. The electric vehicle system also includes an auxiliary battery module that is attachable to the electric vehicle for providing electrical power to the electric motor via a first electrical connector at the auxiliary battery module and a second electrical connector at the electric vehicle that mates with the first electrical connector. The auxiliary battery module is configured to be positioned in the cargo area while supplying power to the electric motor, and is configured to be removable and reattachable from the electric vehicle. The auxiliary battery module includes an integrated cooling system for cooling the auxiliary battery module during operation of the electric vehicle, the integrated cooling system including a conduit for circulating coolant within the auxiliary battery module.

According to an example, an auxiliary battery module for providing electrical power to a powertrain of an electric vehicle for transporting human passengers or cargo is described. The auxiliary battery module includes: a battery housing; a battery disposed in the battery housing; support portions at the battery housing configured to securely mount the battery housing of the auxiliary battery module to support members of an electric vehicle at a cargo area of the electric vehicle using releasable fasteners or latching mechanisms to permit the auxiliary battery module to be removed from and reattached to the electric vehicle; a first electrical connector at the battery housing and electrically connected to the battery disposed in the battery housing, the first electrical connector configured to mate with a corresponding second electrical connector at the electric vehicle to permit the auxiliary battery module to power a powertrain of the electric vehicle to propel the electric vehicle; and an integrated cooling system inside the battery housing for cooling the auxiliary battery module during operation of the electric vehicle, the integrated cooling system comprising a conduit for circulating coolant within the auxiliary battery module.

According to an example, a method of utilizing an auxiliary battery module with an electric vehicle, the electric vehicle suitable for transporting human occupants or cargo, is described. The method includes attaching an auxiliary battery module to an electric vehicle, the auxiliary battery module being configured to be removable from and reattachable to the electric vehicle, said attaching comprising electrically connecting the auxiliary battery module in parallel with a primary battery of the electric vehicle; providing electrical power from the auxiliary battery module to an electric motor of the electric vehicle via a first electrical connector at the auxiliary battery module and a second electrical connector at the electric vehicle that mates with the first electrical connector for propelling the electric vehicle; monitoring a temperature of the main battery of the electric vehicle and a temperature of the auxiliary battery module; and cooling the auxiliary battery module based on said monitoring with an integrated cooling system of the auxiliary battery module during operation of the electric vehicle, the integrated cooling system comprising a conduit for circulating coolant within the auxiliary battery module.

According to an example, an auxiliary battery module system for an electric vehicle, the electric vehicle suitable for transporting human occupants or cargo, is described. The auxiliary battery module system includes: means for attaching an auxiliary battery module to an electric vehicle, the auxiliary battery module being configured to be removable from and reattachable to the electric vehicle, said means for attaching electrically connecting the auxiliary battery module in parallel with a primary battery of the electric vehicle; means for providing electrical power from the auxiliary battery module to an electric motor of the electric vehicle via a first electrical connector at the auxiliary battery module and a second electrical connector at the electric vehicle that mates with the first electrical connector for propelling the electric vehicle; means for monitoring a temperature of the main battery of the electric vehicle and a temperature of the auxiliary battery module; and means for cooling the auxiliary battery module based on said monitoring with an integrated cooling system of the auxiliary battery module during operation of the electric vehicle, the integrated cooling system comprising a conduit for circulating coolant within the auxiliary battery module.

DETAILED DESCRIPTION OF EXEMPLARY EMBODIMENTS

Figure 1A:
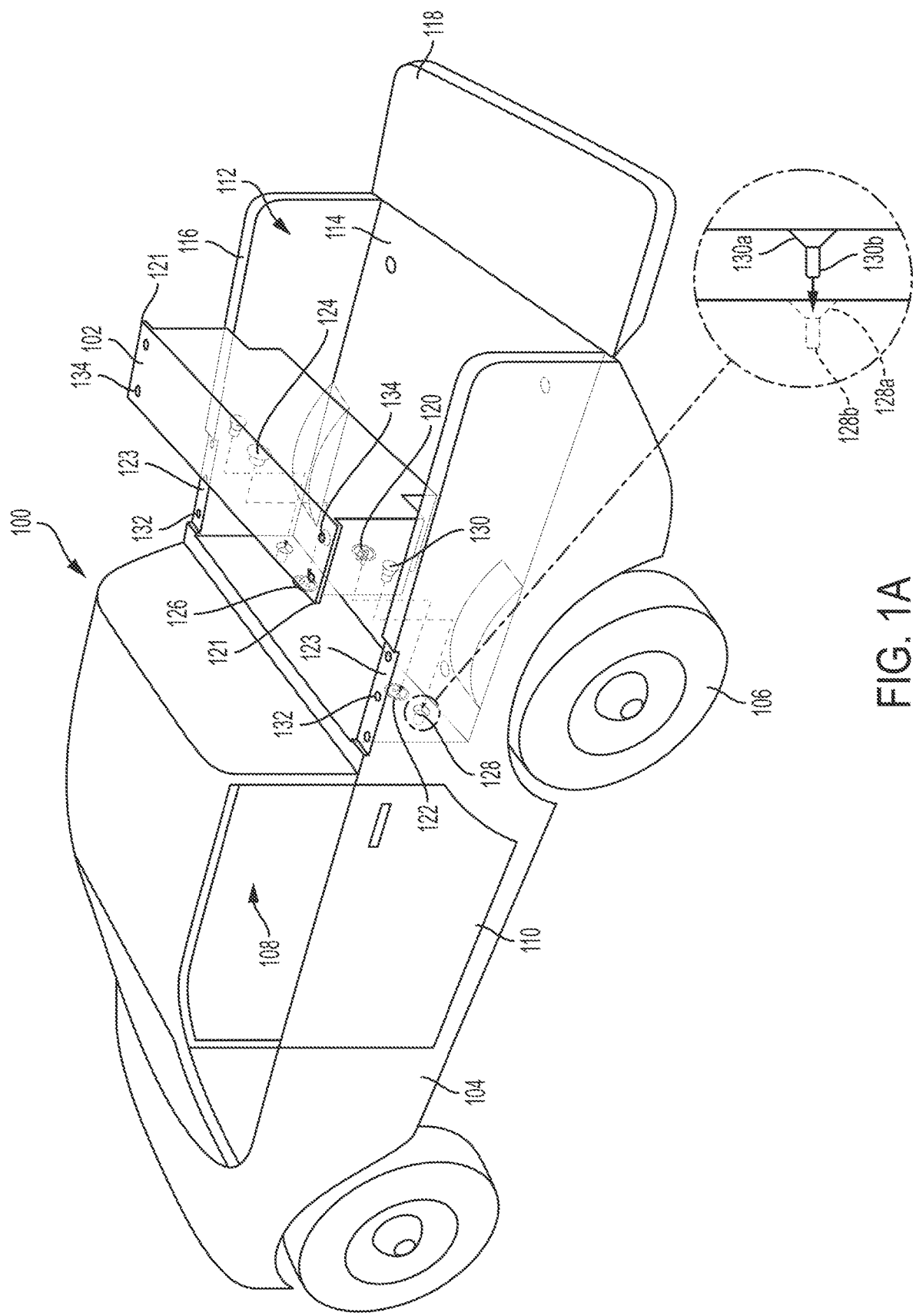
FIGS. 1A-1C illustrate an exemplary electric vehicle system including an electric vehicle with a primary battery and including a removable auxiliary battery module that can be removed from and reattached to the electric vehicle according to examples of the disclosure.

FIG. 1A illustrates an exemplary automotive electric vehicle system comprising an electric vehicle 100 and a removable auxiliary electric battery module 102 that can be attached, removed, and reattached to the same electric vehicle 100 or a different electric vehicle to provide additional power to the powertrain of an electric vehicle for propelling the vehicle as may be desired according to an example of the disclosure. As shown in FIG. 1A, the exemplary electric automotive vehicle 100 includes a body 104, multiple wheels/tires 106, a cabin 108 sized for one or more human occupants, one or more doors 110 that provide access to the cabin 108, and a cargo area 112 (e.g., cargo bed) including a support surface 114 and side members 116 (e.g., bed sides). The electric vehicle 100 may also include a cargo area door 118 (e.g., tailgate). The electric vehicle 100 also includes one or more electric motors (not shown in FIG. 1A) for propelling the electric vehicle 100 and a primary battery (not shown in FIG. 1A) for providing electrical power to the electric motor(s) for propelling the electric vehicle 100.

The electric vehicle 100 is suitable for driving on roadways and may be shared among a plurality of users (drivers) or among a plurality of uses controlled by an entity (owner or other responsible entity) to permit enhanced utilization of the vehicle 100. The vehicle 100 may be configured for driving by a human driver or configured for autonomous driving without a human driver. For autonomous driving without a human driver, the vehicle can be configured with an array of sensors, including LIDAR (light detection and ranging), camera systems for acquiring real-time video imagery of obstacles and other vehicles, GPS (global positioning system), wireless communication systems for sending and receiving communications regarding road information and traffic in real-time, as well as a computer for applying driving rules and making driving decisions based on data and information acquired from the foregoing, in a suitable manner such as conventionally known in the art.

Figure 1C:
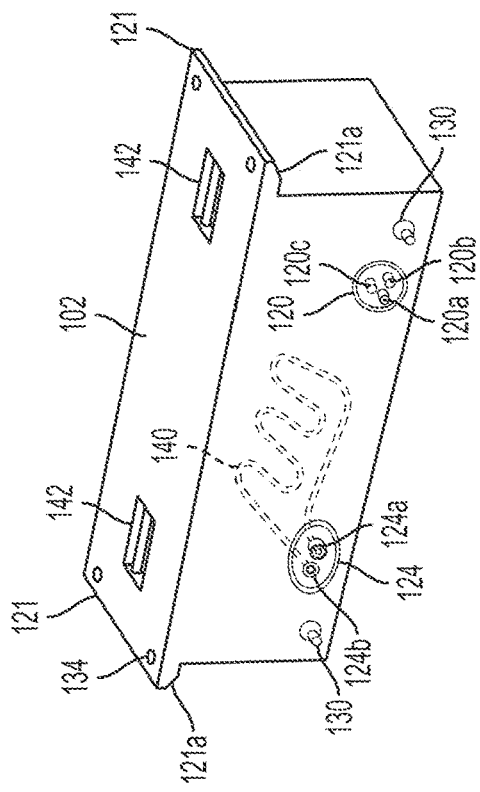

As shown in FIG. 1C, the exemplary auxiliary battery module 102 comprises a battery housing 103 and a battery disposed therein comprising a plurality of individual battery cells (not shown), and those battery cells may be arranged and configured within the auxiliary battery module 102 in any suitable manner such as conventionally known in the art for powertrain batteries for electric vehicles. The auxiliary battery module 102 may be configured to provide, for example, 10 kWh, 15 kWh, 20 kWh, etc., of electrical energy and may weight several hundred pounds or more. Accordingly, the battery housing 103 and any inner supports for the auxiliary battery module 102 should be constructed of sufficiently strong materials, such as metal alloys, fiber composite materials, combinations thereof, etc., so as to support the weight of the auxiliary battery module 102 and provide sufficient strength in the attachment regions thereof, to accommodate normal expected use and remain secured in potential collision events. The corresponding supporting portions of the electric vehicle 100 should likewise be constructed of such materials to sufficient strength. The main battery may be configured to provide, for example, 50 kWh, 70 kWh, 100 kWh, etc., of electrical energy, and it will be appreciated therefore that the auxiliary battery module can provide substantially additional power for increasing the range of the electric vehicle 100.

In the example of FIG. 1A, the auxiliary battery module 102 is configured to have a height and width approximately the same as the height and width of the cargo area 112, e.g., about 15-20 inches deep by about 48-60 inches wide, for instance, and a depth in the lengthwise direction of about 12-24 inches, for instance. This configuration permits a substantial portion of the cargo area 112 to remain available for other cargo. These dimensions are merely exemplary, and other dimensions may be used.

Figure 1B:
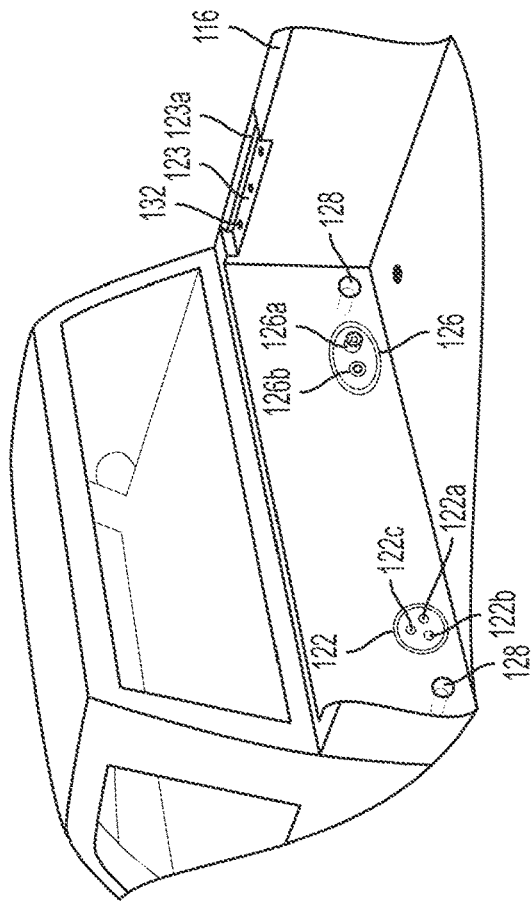

As shown in FIGS. 1A-1C, the exemplary auxiliary battery module 102 includes a battery housing 103 and a first electrical connector 120 mounted to the housing 103, and the electric vehicle 100 includes a second electrical connector 122 mounted to a forward sidewall of the cargo area 112, wherein the second electrical connector 122 mates with the first electrical connector 120 such that the auxiliary battery module 102 can provide electrical power to the electric motor(s) that propel the electric vehicle 102. In other words, both the primary battery of the electric vehicle 100 and the auxiliary battery module 102 can provide power to the electric motor(s) of the vehicle powertrain to propel the electric vehicle 100. In this regard, and as will be discussed in further detail below, the electrical connectors 120 and 122 include high-voltage connections 120*a*, 120*b* and 122*a*, 122*b*, respectively, that permit the auxiliary battery module 102 to be electrically connected in parallel with the vehicle's primary battery and may include one or more low-voltage connections 120*c* and 122*c*, respectively, to provide electrical connection to sensors and electrical circuitry for monitoring and control associated with operation of the auxiliary battery module 102 when attached to the electric vehicle 100.

The auxiliary battery module 102 can be configured to be positioned in the cargo area 112 of the electric vehicle 100 while supplying electric power to the motor(s) that propel the electric vehicle, and can be configured to be removable from and reattachable to the electric vehicle 100. In this regard, as shown in FIGS. 1A-1C, protruding support portions 121 (support members) that protrude laterally at a top side of the auxiliary battery module 102 may be placed on corresponding recessed portions 123 of the vehicle side members 116 to support the auxiliary battery module 102. For example, the auxiliary battery module 102 may be lowered onto the electric vehicle 100 via a winch with a cable and hooks that can hook onto grab areas 142 shown in FIG. 1C, or the auxiliary battery module 102 may be lowered with a winch that includes cables attached to threaded eye-bolts which may be screwed into holes 134 of the auxiliary battery module 102 in examples where those holes 134 are threaded. Alternatively, the auxiliary battery module may include bottom cutout portions in the battery housing 103 to accommodate forks of a forklift so that the auxiliary battery module 102 can lifted with a forklift and lowered onto the electric vehicle 100. Once the auxiliary battery module 102 is in proper position, fasteners such as threaded bolts may be placed through holes 134 of the auxiliary battery module 102 and fastened into receptacles such as threaded holes 132 located at the recessed portions 123 of the side members 116 to secure the auxiliary battery module 102 to the electric vehicle 100. Other latching mechanisms other than threaded bolts may be used to secure the auxiliary battery module 102, such as, for example, over-center latches with locks, tab-in-slot latching mechanisms (e.g., similar to seat belt/safety belt locking mechanisms), and electromechanical automatic cinching latches such as commonly used on vehicle door locks provided they are constructed using suitable strength/gauge materials to accommodate the weight of the auxiliary battery module 102, which may be several hundred pounds or more. Of course, the side members 116 and/or other support members of the electric vehicle 100 to which the auxiliary battery module 102 is attached should be constructed of high strength materials with suitable underlying supports to accommodate the weight of the auxiliary battery module 102 for normal expected uses and potential collision impacts. The auxiliary battery module 102 may be attached to, removed from, and reattached the electric vehicle 100, or another electric vehicle equipped to accommodate auxiliary battery modules like auxiliary battery module 102, such as for a fleet of electric vehicles that are equipped to accommodate such auxiliary battery modules 102.

According to an example, as shown in FIG. 1C, and as will be discussed in further detail below, the auxiliary battery module 102 includes an integrated cooling system for cooling the auxiliary battery module 102 during operation of the vehicle, wherein the integrated cooling system comprises a first conduit portion 140 within the auxiliary battery 102 for circulating coolant within the auxiliary battery module 102. The first conduit portion 140 may wind between and among the multiple individual battery cells (not shown) of the auxiliary battery module 102, and in this regard, the first conduit portion 140 may configured as tubing (e.g., tubing of copper alloy, aluminum alloy, steel alloy, etc.) that winds among the multiple battery cells, e.g., with windings at multiple heights. Thermal contact between the first conduit portion 140 and the battery cells may be enhanced to facilitate transfer of heat between the conduit 140 and the battery cells, e.g., by disposing any suitable thermal contact material therebetween, such as thermoplastic materials with good thermal conductivity known in the art for conducting heat from and/or to battery cells. As shown in FIGS. 1A-1C, the auxiliary battery module 102 includes a first fluid connector 124 including an inlet port 124*a* and an outlet port 124*b*, and the electric vehicle 100 includes a complementary second fluid connector 126 that mates with the first fluid connector 124 and that includes a complementary inlet port 126*a* and a complementary outlet port 126*b* and to provide liquid-tight couplings that permit flow of coolant from the electric vehicle 100 into the auxiliary battery module 102 and that permits return flow of coolant from the auxiliary battery module 102 back to the electric vehicle 100. For example, the respective inlet ports and outlet ports can be provided by suitable metal flat-face, dry-break connectors, such as illustrated by connector 150 and connector 160 shown in the example of FIG. 2.

Figure 2:
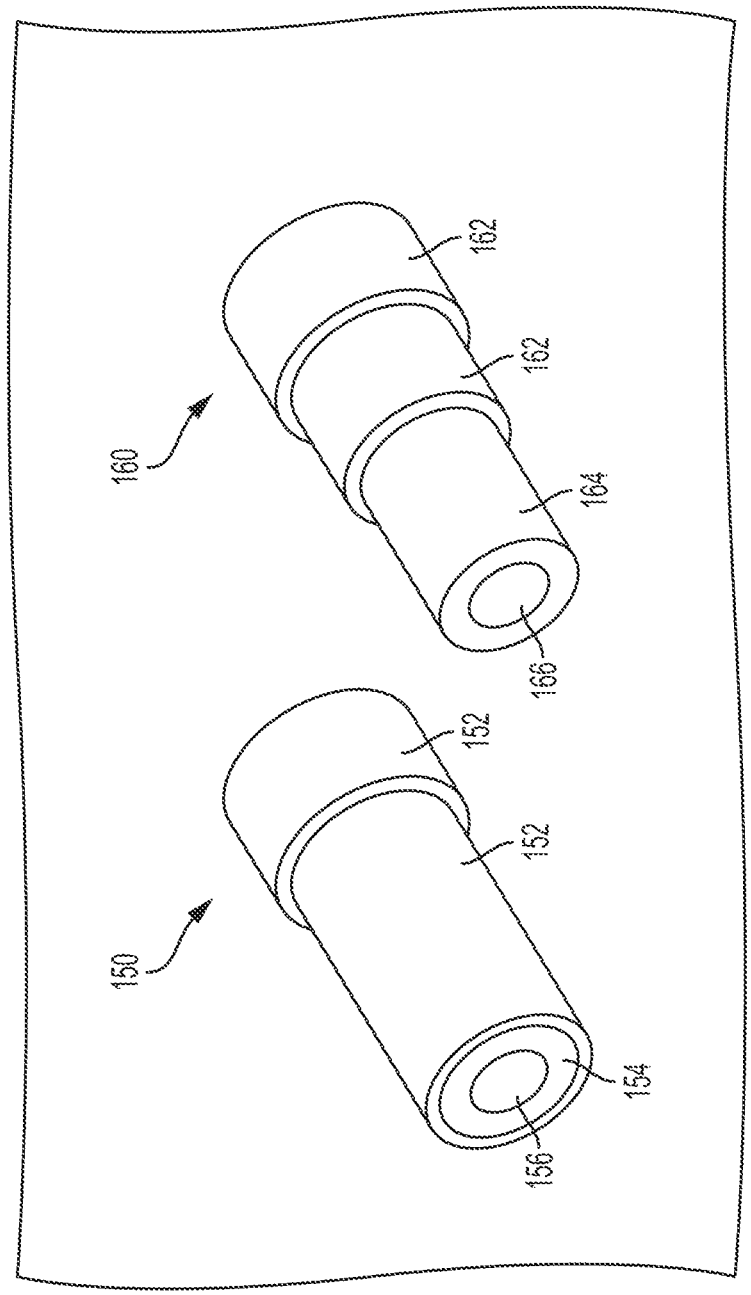
FIG. 2 illustrates exemplary dry-break fluid connectors that may be utilized to pass coolant between an electric vehicle and an auxiliary battery module according to examples of the disclosure

Conventional flat-face, dry-break connectors are a type of dry-break connector that permits fluid-flow systems to be separated with little to no loss of fluid. Such conventional flat-face, dry-break connectors include a releasable locking mechanism based on complementary locking features to lock first and second (e.g., male and female) ends together when coupled, such as 1) a retractable sleeve on one connector that forces a ring of metal bearings into a ring shaped groove on the other connector, 2) complementary threaded housings that screw together, or 3) a protrusion on one connector that rides in a groove on the other connector and locks with a relative rotation of the connectors. In contrast to conventional dry-break connectors that include an integrated locking mechanism via integrated locking features provided at the housings of the connectors, according to examples of the present disclosure, the first and second fluid connectors 124 and 126 can each be provided by a pair of flat-face, dry-break connectors without a locking mechanism at the first and second connectors, i.e., without locking features on the respective connector housings, such as illustrated in FIG. 2. In this regard, a connector 150 as shown in FIG. 2 may serve as inlet port 124*a*, and another such connector 150 may serve as inlet port 126*a*. Likewise, a connector 160 may serve as outlet port 124*b*, and another such connector 160 may serve as outlet port 126*b*.

Exemplary connector 150 includes a metal housing 152, a spring loaded retractable metal sleeve 154, and a metal center rod 156. Exemplary connector 160 includes a metal housing 162, a metal sleeve, and a retractable metal piston 166. Connector 150 can be connected to connector 160 by bringing their respective faces into contact and forcing them together, whereby sleeve 164 pushes retractable sleeve 154 inward, and center rod 156 pushes piston 166 inward, such that a fluid pathway is opened between connectors 150 and 160, with a fluid-tight connection being made by internal seals. The internal seals and internal mechanisms of the connectors 150 and 160 are of a typical nature for conventional flat-face connectors known in the art. Aside from the lack of integrated locking features at the housings of connectors 150 and 160, the connectors 150 and 160 can be otherwise configured to satisfy desired performance specifications, such as, e.g., military specifications MIL-C-7413B or MIL-C-25427A. Integrated locking features need not be provided at connectors 150 and 160, e.g., at the housings 152 and 162 thereof, because the auxiliary battery module 102 is structurally secured to the electric vehicle 100 with structural fasteners or other latching mechanisms as previously described herein, thereby securing and maintaining the first and second electrical connectors 120, 122 and first and second fluid connectors 124, 126 fixed in place relative to their respective counterpart (complementary) connectors.

To facilitate proper positioning of the auxiliary battery module 102 relative to the electric vehicle 100 to thereby provide proper alignment of the first and second electrical connectors 120, 122 and the first and second fluid connectors 124, 126 during attachment (mounting), removal, and reattachment of the auxiliary battery module 102 in relation to the electric vehicle 100, an alignment system may be provided. In this regard, alignment guides can provided at the electric vehicle 100 that mate with alignment members at the auxiliary battery module 102 to guide the positioning of the auxiliary battery module 102 during attachment. For example, as illustrated in FIGS. 1A-1C, protruding support portions 121 of the auxiliary battery module 102 may have downward facing tapered surfaces 121a that mate with complementary upward facing tapered surfaces 123a of recessed portions 123 of sidewall members 116. In this way, when the auxiliary battery module 102 is lowered onto the electric vehicle 100, downward facing tapered surfaces 121a will contact upward facing tapered surfaces 123a, such that any lateral misalignment of the auxiliary battery module 102 relative to the supporting recessed portions 123, will undergo self-correcting alignment (self alignment). The recessed portions 123 can have a length in a lengthwise direction extending between the front and rear of the vehicle 100 that is longer, e.g., several (3, 4, 5, 6) inches longer, than a length of the protruding support portions 121 of the auxiliary battery module in the lengthwise direction. The auxiliary battery module 102 can thereby be lowered initially onto the electric vehicle rearward of its intended final position, e.g., several inches rearward, so that no vertical interference occurs between first and second electrical connectors 120 and 122 nor between first and second fluid connectors 124 and 126 as the auxiliary battery module 102 is being lowered, so as to prevent any damage to such connectors during attachment (mounting) of the auxiliary battery module 102. The auxiliary battery module 102 can then be pushed forward to engage the electrical and fluid connections and secure the auxiliary battery module 102 to the electric vehicle 100.

To further facilitate proper alignment of the auxiliary battery module 102, as illustrated in the example of FIGS. 1A-1C, receptacles 128 recessed into a forward sidewall of the cargo area 112, having a tapered opening portion 128a and a cylindrical opening portion 128b, can mate with protruding alignment members 130 at a forward sidewall of the battery housing 103 of the auxiliary battery module 102, wherein the protruding alignment members 130 have a complementary tapered portion 130a and cylindrical portion 130b. After the auxiliary battery module 102 is initially positioned so as to place protruding support portions 121 on recessed portions 123 of the vehicle side members 116, the auxiliary battery module 102 can then pushed forward, any misalignment of the auxiliary battery module will be corrected as the protruding cylindrical portion 130b contacts tapered opening portion 128a, which then guide protruding cylindrical portion 130b into cylindrical opening portion 128b as the auxiliary battery module 102 is pushed forward, thereby providing for proper connection and seating of the first and second electrical connectors 120, 122 and the first and second fluid connectors 124, 126. The receptacle 128 and corresponding protruding portion 130 may be configured to have sizes in a lengthwise direction extending between the front and rear of the electric vehicle 100 such that the receptacle 128 and protruding portion 130 engage and align before the respective electrical connectors 120 and 122 and respective fluid connectors 124 and 126 engage with one another, so as to ensure proper alignment and prevent damage to such connectors.

Figure 3C:
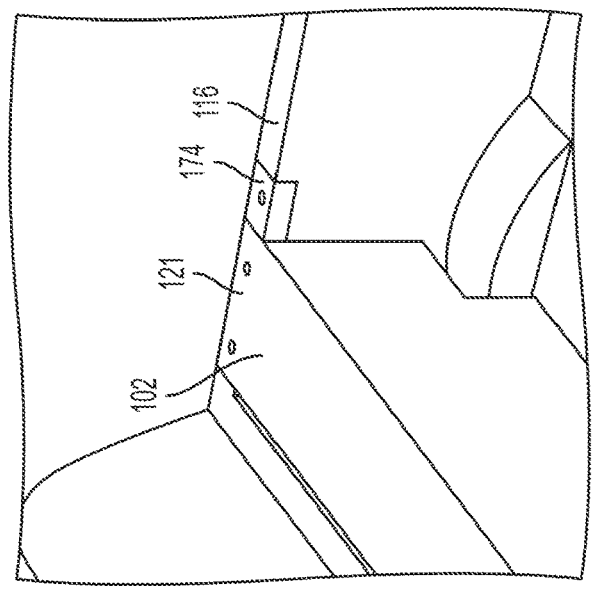
FIGS. 3A-3C illustrates exemplary attachment components for attaching an auxiliary battery module to an electric vehicle according to examples of the disclosure.
Figure 3B:
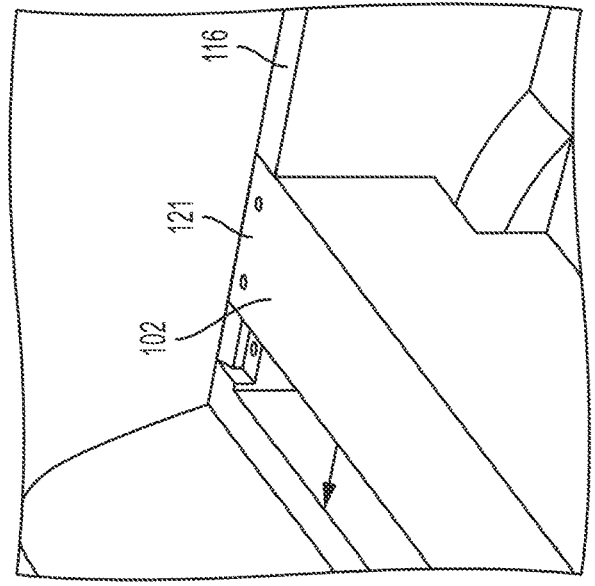
Figure 3A:
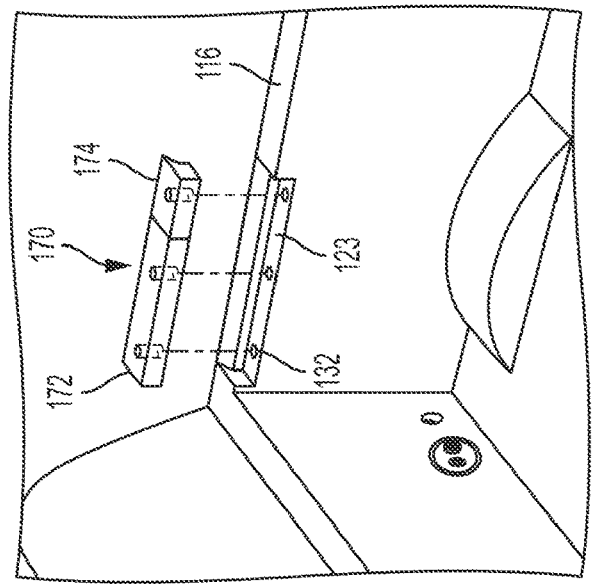

Additionally, according to another exemplary aspect, as shown in FIGS. 3A-3C, an insert 170 may be provided to fill the recessed portion 123 when an auxiliary battery module 102 is not attached to the electric vehicle 100. For example, the insert 170 may comprise a first (e.g., front) insert member 172 and a second (e.g., rear) insert member 174, which may be attached to the sidewall members 116 with fasteners such as threaded bolts that pass through holes in the insert 170 and can be secured into threaded holes 132. The insert 170 may be made from metal alloy (e.g., aluminum alloy), plastic materials, or composite materials, for example. As shown in FIG. 3B, the insert 170 can be removed, and an auxiliary battery module 102 can be lowered onto the electric vehicle several inches rearward of the intended final secured position of the auxiliary battery module 102. As shown in FIG. 3C, the auxiliary battery module can then be pushed forward to its final intended position and secured to the electric vehicle 100 as described above. Finally, the second (rear) insert member 174 can be inserted into the remaining gap of the recessed portion 123 so as to eliminate the gap and provide a smooth, continuous surface across the tops of the side member 116, second insert member 174, and protruding support portions 121. In this regard, it will be appreciated that insert 170 has a size and shape like that of the protruding support portions 121, and complementary to the size and shape of the recessed portion 123.

While one auxiliary battery module 102 is illustrated in FIGS. 1A and 1B, multiple auxiliary battery modules 102 may be utilized and attached to (mounted in) the electric vehicle 100 and electrically connected together in parallel to provide further electrical power reserves, e.g., by placing one next to another. In such cases, one or more of the auxiliary battery modules may each be equipped with multiple electrical connectors in a manner such as described above to provide electrical connection between adjacent auxiliary battery modules 102 themselves as well as to the electric vehicle 100. Additional electrical connection considerations for such examples will be discussed below. Also, in such cases, one or more of the auxiliary battery modules may each be equipped with multiple fluid connectors in a manner such as described above to provide coolant flow between adjacent auxiliary battery modules 102 themselves as well as to the electric vehicle 100.

Figure 4A:
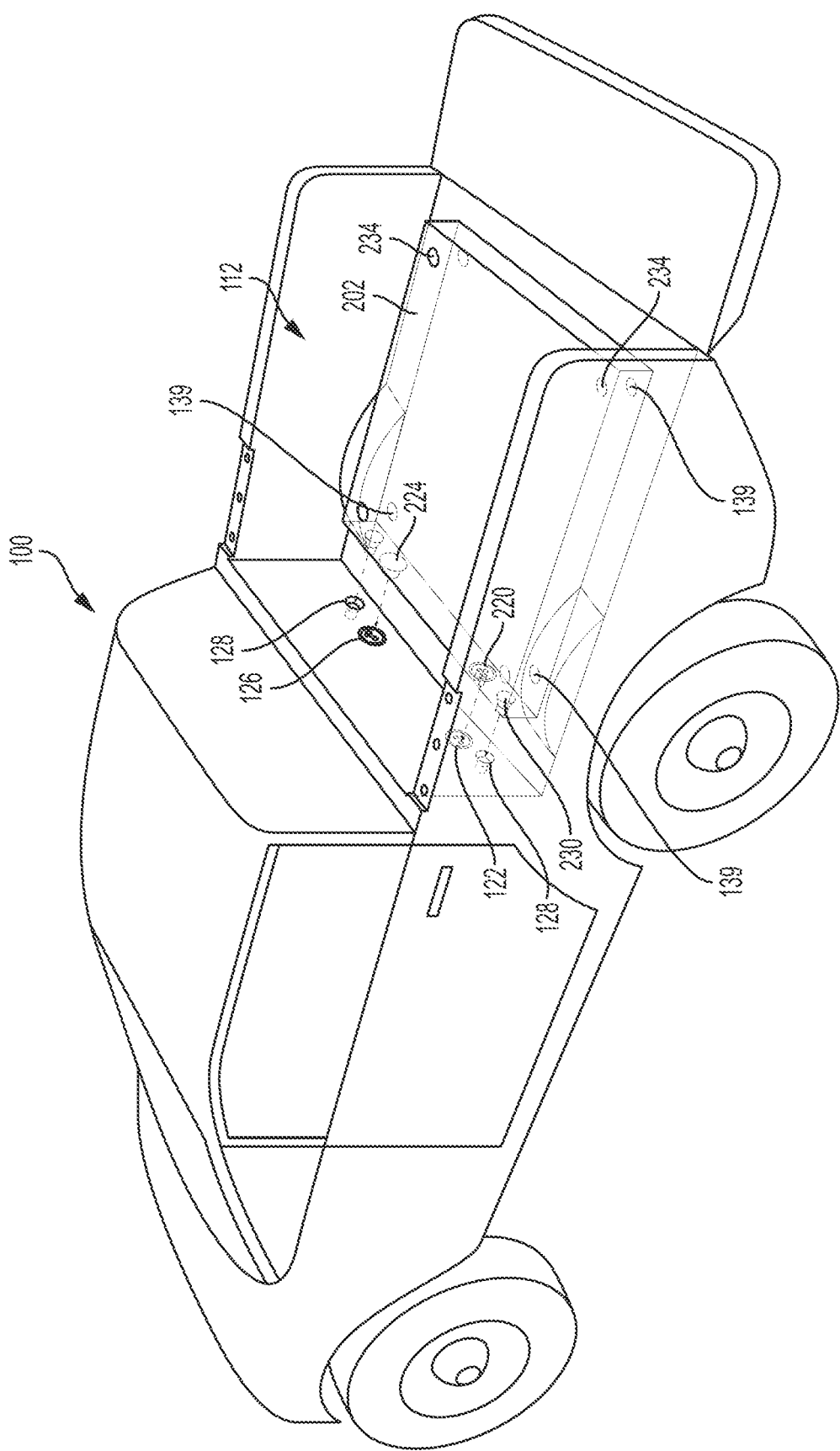
FIGS. 4A-4C illustrate another exemplary electric vehicle system including an electric vehicle with a primary battery and including a removable auxiliary battery module that can be removed from and reattached to the electric vehicle according to examples of the disclosure.
Figure 4C:
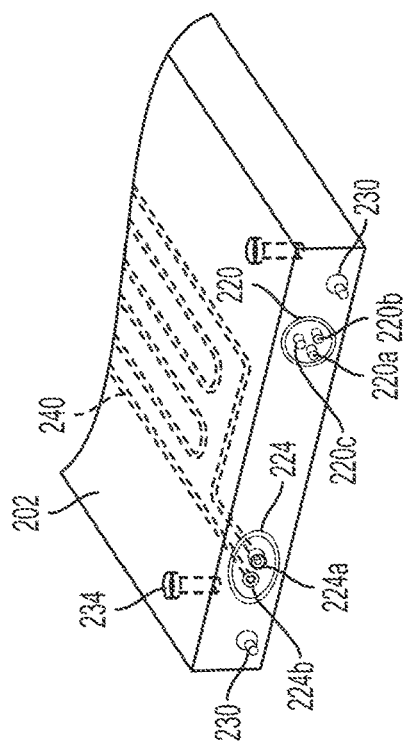
Figure 4B:
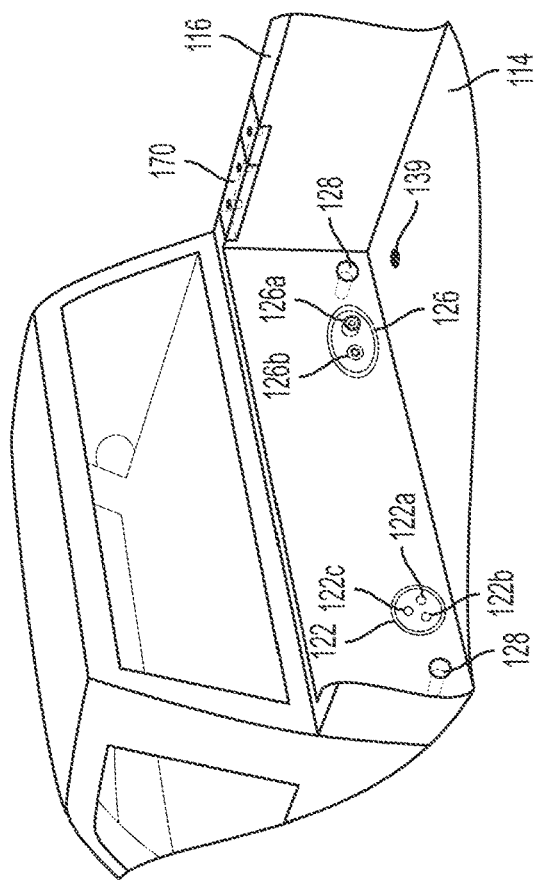

Another example of an electric vehicle system according to the disclosure is illustrated in FIGS. 4A-4C. The electric vehicle system illustrated in FIGS. 4A-4C comprises an electric vehicle 100 and another example of an auxiliary battery module 202. The electric vehicle 100 illustrated in the example of FIGS. 4A-4C is the same as the electric vehicle 100 previously described in connection with FIGS. 1A-1C and 3A-3C, and description of the electric vehicle 100 is not reproduced again here. In this example, the auxiliary battery module 202 has a different shape than the auxiliary module 102 previously described herein, the auxiliary battery module 202 having a shorter height, e.g., of about 8-12 inches, for instance, and a width and depth that about the same as the usable width and depth of the cargo area 112, e.g., about 48-60 inches by about 60-80 inches, for instance. These dimensions are merely exemplary, and other dimensions may be used.

In other respects, the construction and features of the auxiliary battery module 202 are like those of the auxiliary battery module 102 previously described. Briefly, the auxiliary battery module 202 includes a battery housing 203 and a battery disposed within the battery housing 203, the battery comprising a plurality of individual battery cells (not shown). The auxiliary battery module further includes a first conduit portion 240 within the auxiliary battery 202 for circulating coolant within the auxiliary battery module 202. The first conduit portion 240 may wind between and among the multiple individual battery cells (not shown) of the auxiliary battery module 202, and in this regard, the first conduit portion 240 may configured as tubing (e.g., tubing of copper alloy, aluminum alloy, steel alloy, etc.) winding among the battery cells, e.g., with windings at multiple heights. Thermal contact between the first conduit portion 240 and the battery cells may be enhanced, e.g., by disposing any suitable thermal contact material disposed therebetween, such as thermoplastic materials with good thermal conductivity known in the art for conducting heat from and/or to battery cells. As shown in FIGS. 4A-4C, the auxiliary battery module 202 includes a first fluid connector 224 including an inlet port 224a and an outlet port 224b, and the electric vehicle 100 includes a complementary second fluid connector 126 that mates with the first fluid connector 224. The second fluid connector 126 includes a inlet port 126a and an outlet port 126b complementary to those of fluid connector 224, and provide liquid-tight couplings that permits flow of coolant from the electric vehicle 100 into the auxiliary battery module 202 and that permits return flow of coolant from the auxiliary battery module 202 to the electric vehicle 100. For example, these respective inlet ports and outlet ports can be provided by metal flat-face, dry-break connectors, such as illustrated by connector 150 and connector 160 shown in the example of FIG. 2 as previously described.

Additionally, the exemplary auxiliary battery module 202 includes a first electrical connector 220, and the electric vehicle 100 includes a second electrical connector 122 that mates with the first electrical connector 220 such that the auxiliary battery module 202 can provide electrical power to the electric motor(s) that propel the electric vehicle 202. The electrical connector 220 includes high-voltage connections 220a and 220b that permit the auxiliary battery module 202 to be electrically connected in parallel with the vehicle's primary battery and may include one or more low-voltage connections 220c, respectively, to provide electrical connection via connection 122c to sensors and electrical circuitry for monitoring and control associated with operation of the auxiliary battery module 202 when attached to the electric vehicle 100.

The auxiliary battery module 202 illustrated in FIGS. 4A-4C can be configured to be positioned in the cargo area 112 of the electric vehicle 100 while supplying electric power to the motor(s) that propel the electric vehicle, and can be configured to be removable from and reattachable to the electric vehicle 100. In this regard, as shown in FIGS. 4A-4C, fasteners such as threaded bolts may be placed through holes 234 of the auxiliary battery module 202 and fastened into receptacles such as threaded holes 139 located in the support surface 114 of the cargo area 112. Other latching mechanisms other than threaded bolts may be used to secure the auxiliary battery module 102, such as, for example, over-center latches with locks, tab-in-slot latching mechanisms (e.g., similar to seat belt/safety belt locking mechanisms), and electromechanical automatic cinching latches such as commonly used on vehicle door lock, provided they are made of suitable strength/gauge materials to accommodate the weight of the auxiliary battery module 102, which may be several hundred pounds or more.

In examples, the auxiliary battery module 202 may be lowered onto the electric vehicle 100 via a winch with cables attached to threaded eye-bolts which may be screwed into holes 234 of the auxiliary battery module 102 in examples where those holes 134 are threaded. Alternatively, temporary lateral lift bars with openings to accommodate forks of a forklift may be attached to the auxiliary battery module 202 so that the auxiliary battery module 202 can lifted with a forklift and lowered onto the electric vehicle 100.

Of course, the battery housing 203 and any inner supports of the exemplary auxiliary battery module 202 should be constructed of sufficiently strong materials as discussed above for the exemplary auxiliary battery module 102 to withstand normal expected use remain secured under potential collision events.

While one auxiliary battery module 202 is illustrated in FIGS. 4A and 4C, multiple auxiliary battery modules 102 may be utilized and attached to (mounted in) the electric vehicle 100 and electrically connected together in parallel to provide further electrical power reserves, e.g., by stacking auxiliary battery modules 202 one on top of another. In such cases, one or more of the auxiliary battery modules may each be equipped with multiple electrical connectors in a manner such as described above to provide electrical connection between the auxiliary battery modules 102 themselves as well as to the electric vehicle 100. Additional electrical connection considerations for such examples will be discussed below. Also, in such cases, one or more of the auxiliary battery modules may each be equipped with multiple fluid connectors in a manner such as described above to provide coolant flow between the auxiliary battery modules 102 themselves as well as to the electric vehicle 100.

Figure 5A:
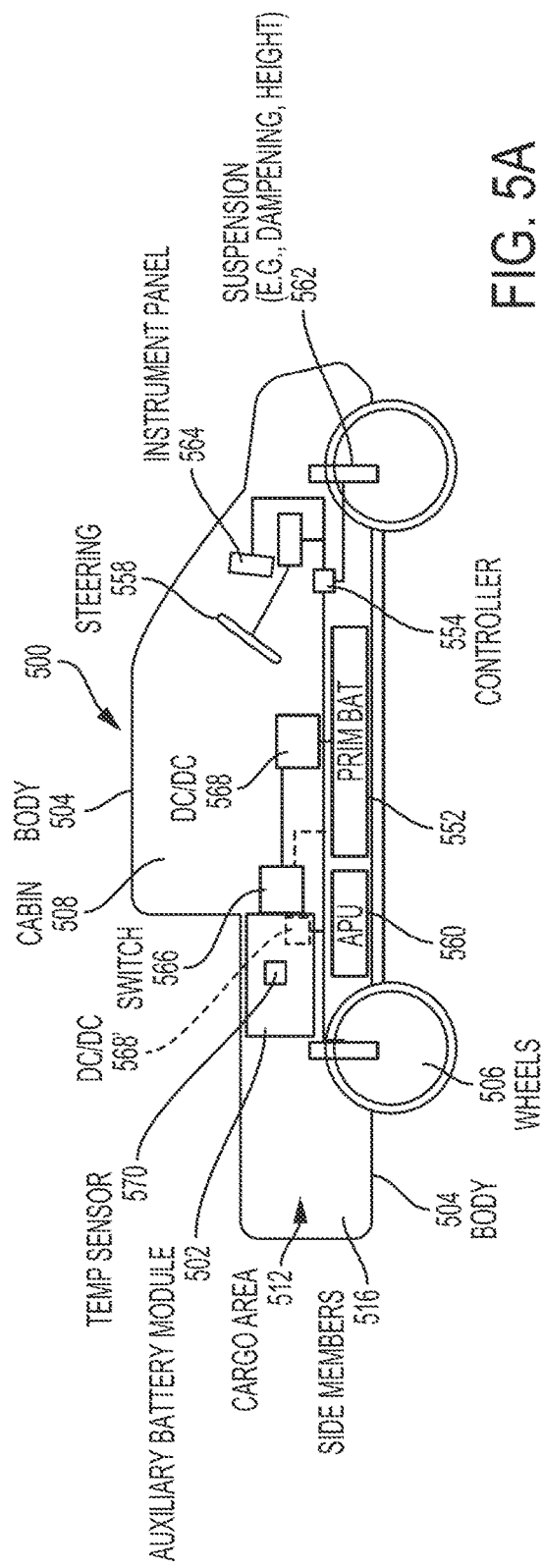
FIGS. 5A and 5B illustrate exemplary block diagrams of an electric vehicle and an auxiliary battery module according to examples of the disclosure.
Figure 5B:
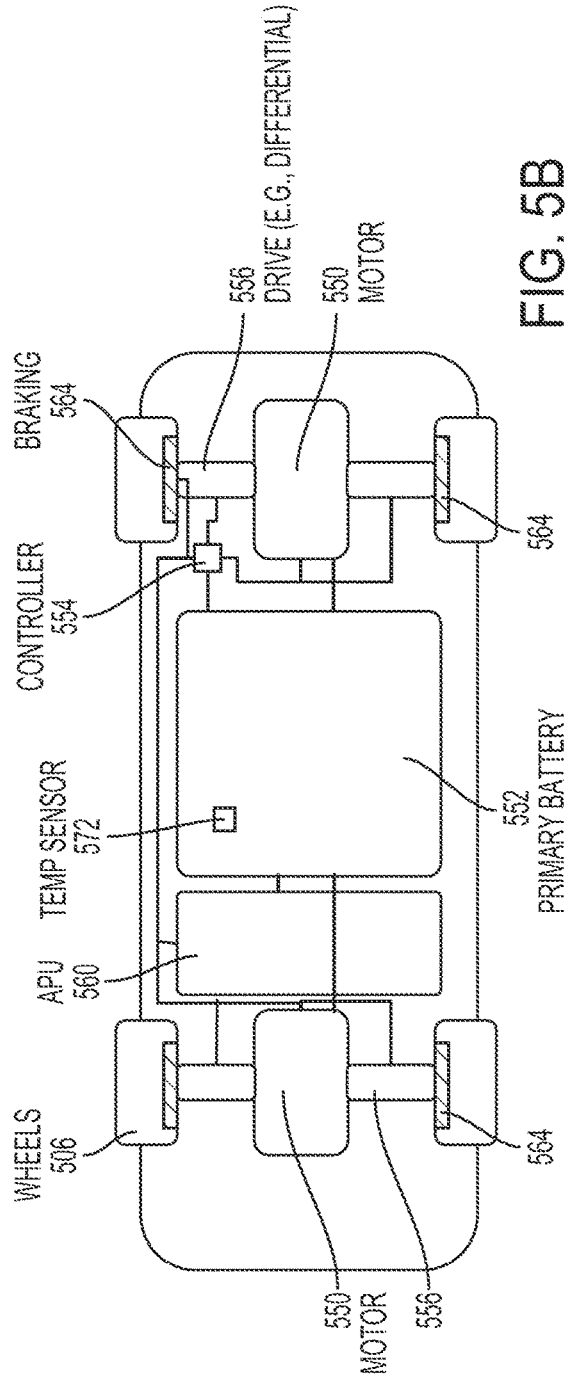

Further considerations relating to configuration and operation of an electric vehicle equipped with an exemplary auxiliary battery module 102 or 202 will now be described with reference to the block diagrams of FIGS. 5A and 5B, which illustrate with additional detail an exemplary electric vehicle 500 like electric vehicle 100 previously described. As shown in the side view of FIG. 5A and bottom view of FIG. 5B, the electric vehicle 500 includes may support an auxiliary battery module 502 such as either auxiliary battery modules 102 or 202 previously described. The electric vehicle 500 includes a body 504, multiples wheels 506, a cabin 508 suitable for human occupants, one or more doors (not shown), a cargo area 512 with a supporting surface and side members 516, one or more electric motors 550 of a powertrain system, and a primary high-voltage battery 552 (which may also be referred to as a primary battery pack) for providing electrical power to the electric motor(s) 550 for propelling the electric vehicle 500. The primary battery 552 and auxiliary battery module 502 may be monitored by a controller 554, which includes an onboard computer, e.g., with voltage detection circuitry and interfaces via suitable low-voltage electrical connections.

The vehicle 500 may also include a drive system 556 that couples rotational motion from the motor(s) 550 to the wheels 506 and that may be monitored and controlled by the controller 554 via suitable electrical connections and interfaces. In some examples, each wheel 506 may be driven by its own motor 550, in which case a drive system 556 may provide a suitable coupling to provide rotation motion from the motor 520 to the wheel 506. In other examples, a motor 550 may drive more than one wheel 506, in which case the drive system 556 may provide suitable coupling for providing rotational motion from the motor 550 to multiple wheels 506, such as through a suitable differential.

The electric vehicle 500 also includes a steering system 528, to provide, e.g., electrical steering, hydraulic steering, or combination thereof, which may also be monitored and controlled by the controller 554 via suitable connections and interfaces. The vehicle 500 also includes suspension components 562, e.g., air-actuated, vehicle-leveling shock absorbers for adjusting ride height and ride dampening, which may also be controlled by the controller 554 via suitable connections and interfaces. The vehicle 500 also includes one or more instrument panels 564, e.g., in the form of flat panel, e.g., liquid crystal, electroluminescent, etc., displays, which may be monitored and controlled by the controller 554 via suitable connections and interfaces. The vehicle also includes braking system components 564, e.g., disks and other components for regenerative braking that may be monitored with suitable detection circuitry and controlled by controller 564.

The auxiliary battery module 502 may be electrically connected in parallel to the electric vehicle 500 as previously described herein for auxiliary battery modules 102 and 202. Further, in this regard, a switch 566 can be provided to electrically isolate the primary battery 552 from the auxiliary battery module 502 until proper electrical connection of the auxiliary battery module 502 is obtained, e.g., which can be verified through voltage detection circuitry that communicates with controller 554. The switch 566 is suitable for high-voltage and high-current use, and may be a mechanical switch located in the vehicle to be operated by a human operator, or the switch 556 may be an electromechanical switch suitable for the voltages and currents applicable to powertrains for electric vehicles, e.g., up to several hundred volts and many tens of amps for varying durations of aggressive driving, and which may be automatically actuated under control of the controller 554.

In addition, a DC/DC converter 568 can be connected between the auxiliary battery module 502 and the primary battery 552 to manage any voltage differences between the primary battery 552 and the auxiliary battery module 502. As an alternative, or in addition, a DC/DC converter 568' may be configured in the auxiliary battery module 502, in which case the switch 556 can be connected between the DC/DC converter 568' and the primary battery 552. Also, while one auxiliary battery module 502 is illustrated in FIGS. 1A and 1B, multiple auxiliary battery modules 502 may be utilized and attached to (mounted in) the electric vehicle 500 and electrically connected together in parallel as previously explained herein to provide further electrical power reserves. In instances where multiple auxiliary battery modules 502 are electrically connected together and utilized, each may include a DC/DC converter 568' located in the auxiliary battery module 502 to manage any voltage differences between multiple auxiliary battery modules 502.

Temperature sensors 570 and 572 may be located at the auxiliary battery module 502 and main battery 552, respectively, such that the controller 554 may monitor the temperatures of those components via suitable electrical connections and interfaces. While the controller 554 is illustrated in FIGS. 5A and 5B as a single block component, multiple controllers may be used to monitor and control the systems of the electric vehicle 500 and auxiliary battery module 502.

The electric vehicle 500 may also include an auxiliary power unit (APU) 560, which may also be monitored and controlled by the controller 554, and may be in the form of, e.g., a gasoline, propane, alcohol or other fuel-driven electric generator that provides additional electrical power to the primary battery 522 via suitable circuitry for powering the powertrain system. In examples, an APU 560 may be configured as removable and reattachable structural module according to the present disclosure.

Figure 6A:
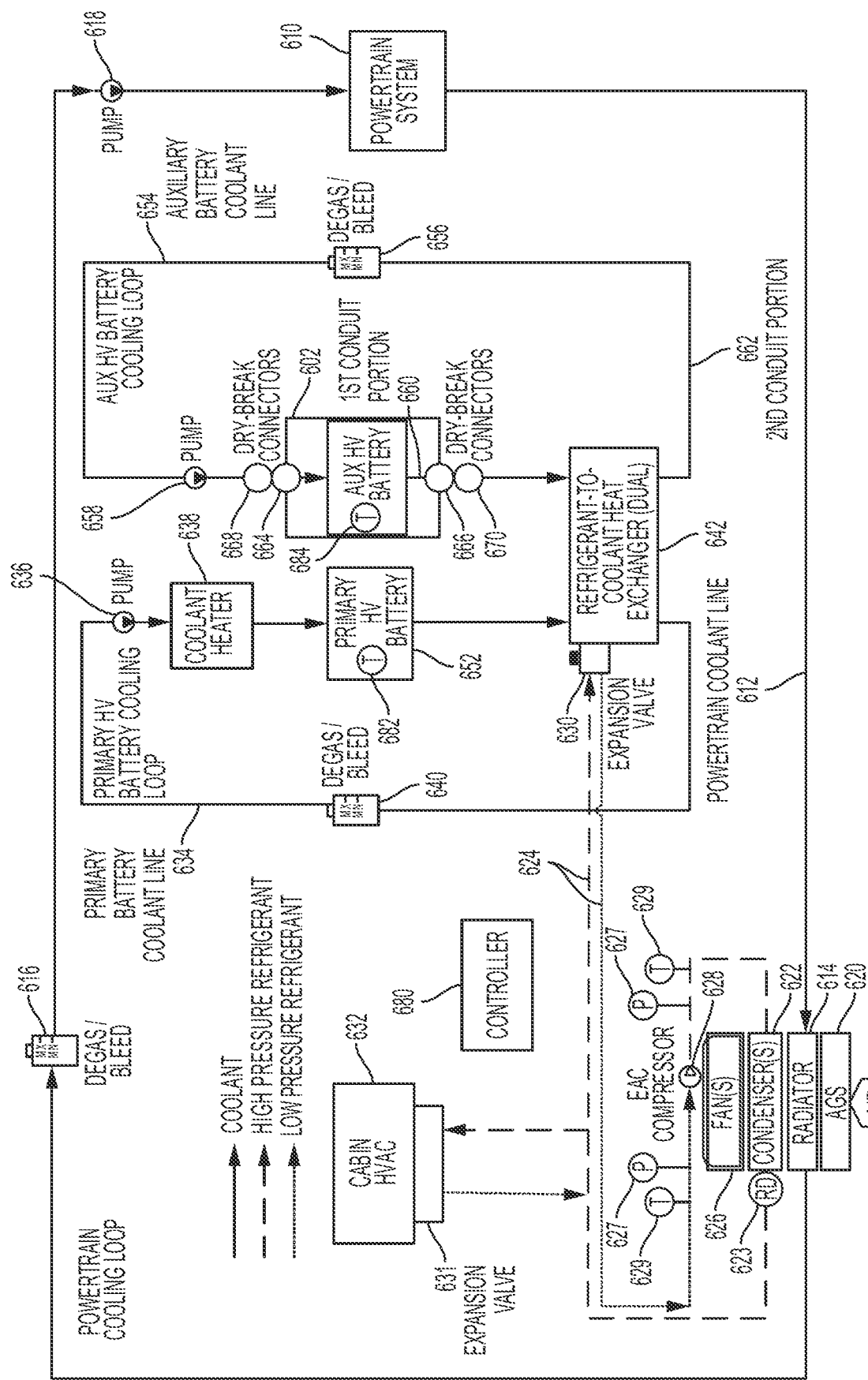
FIGS. 6A-6D illustrate block diagrams of exemplary thermal management systems for cooling a primary battery of an electric vehicle and an auxiliary battery module connected to the electric vehicle, wherein coolant from the electric vehicle is used to cool the auxiliary battery module according to examples of the disclosure.

Further considerations relating to configuration and operation of thermal management for the auxiliary electric battery module and main battery will now be described with reference to FIGS. 6A-6D. FIG. 6A illustrates an exemplary functional block diagram of a thermal management system for an electric vehicle having features previously described for electric vehicles 100 and 500, including a primary battery 652, e.g., such as primary battery 552, and utilizing an auxiliary battery module 602 such as auxiliary battery modules 102, 202 and 502 as previously described herein, wherein both the auxiliary battery module 602 and primary battery 652 provide power to the vehicle powertrain for propelling the electric vehicle. Components other than the auxiliary battery module 602 illustrated in FIG. 6A are components of the electric vehicle in the example of FIG. 6A.

As shown in FIG. 6A, the electric vehicle comprises a powertrain system 610 (including one or more electric motors such as previously described), a powertrain coolant line 612 that passes through a radiator 614, and that is connected to a degas/bleed coolant reservoir 616, and that is further connected to a pump 618 for circulating coolant. The electric vehicle also includes an active grill shutter AGS 620 positioned adjacent to the radiator 614 and controlled by a motor or other suitable actuator. The vehicle 100 also includes a refrigeration system including a condenser 622, a receiver dryer (RD) 623 (e.g., comprising a desiccant to remove moisture), refrigerant lines 624, a fan 626, an electric A/C compressor (EAC) 628, and expansion valve 630, which may be a thermal expansion valve with a solenoid or an electronic expansion valve. Refrigerant lines 624 are shown, in this example, using a dotted line to illustrate what may typically be a low pressure refrigerant (e.g., which may correspond to a gaseous state) and using a dashed line to illustrate what may typically be a high pressure refrigerant (e.g., which may correspond to a liquid state). Pressure sensors 627 and temperature sensors 629 may be located at one or both refrigerant lines 624 at both sides of the EAC 628 to monitor/measure the pressure and temperature, respectively, of the refrigerant, e.g., for use in controlling the EAC 628. The refrigerant system is also connected to a cabin HVAC module 632 via an expansion valve 631 and refrigerant lines 624 for providing cabin air conditioning.

In the example of FIG. 6A, the electric vehicle also includes a primary battery coolant line 634 (e.g., metal tubing such as copper alloy, aluminum alloy, steel alloy, etc.) that is connected to a coolant pump 636, a coolant heater 638, a degas/bleed coolant reservoir 640, a heat exchanger 642 (e.g., a refrigerant-to-coolant heat exchanger), and the primary battery 652. These components as connected by the primary battery coolant line 634 and together with the primary battery coolant line 634 form a primary battery cooling loop.

In addition, in the example of FIG. 6A, the electric vehicle includes an auxiliary battery coolant line 654 (e.g., metal tubing such as copper alloy, aluminum alloy, steel alloy, etc.) that is connected to another degas/bleed coolant reservoir 656, another coolant pump 658, the auxiliary battery module 602 (with an internal first conduit portion 660), and the heat exchanger 642. The portion of the auxiliary battery coolant line 654 that resides outside the auxiliary battery module 602 may be referred to as a second conduit portion 662. Such as previously described herein, the auxiliary battery module includes a first fluid connector including an inlet fluid connector 664 and an outlet fluid connector 666, respectively (e.g., suitable dry-break fluid connectors, such as flat-face fluid connectors described previously herein). In addition, the electric vehicle includes a second fluid connector including an inlet fluid connector 670 and an outlet fluid connector 668, respectively (e.g., dry-break fluid connectors, such as flat-face fluid connectors such as previously described herein).

A controller 680 (that includes an onboard computer) at the electric vehicle, such as previously described herein, monitors a first temperature sensor 682 at the primary battery 652 and a second temperature sensor 684 at the auxiliary battery module 602, and detects whether either of those temperature sensors measure an out-of-range temperature condition (e.g., a measured temperature exceeds one or more upper threshold values or falls below one or more lower threshold values), and, if so, and can control and adjust (via electrical signals over electrical connection lines, not shown in FIG. 6A) any or all of the EAC compressor 628, pumps 636 and 658, fan 626, active grill shutter 620, expansion value 630, and coolant heater 638 to bring and maintain the temperature of the respective battery 602 or 652 to values within one or more permissible ranges.

In the example of FIG. 6A, it will be observed that the primary battery cooling loop and the auxiliary battery module cooling loop are separate closed coolant loops and may therefore be considered parallel closed coolant loops. In addition, it will be observed that both the primary battery cooling loop and the auxiliary battery module cooling loop share the same heat exchanger 642 (e.g., refrigerant-to-coolant heat exchanger), and in this sense, the heat exchanger 642 may be considered a dual heat exchanger.

With regard to disconnection and reconnection of the auxiliary battery module 602, it will be observed that no isolation valves are necessary to close off the auxiliary battery module cooling loop, because disconnection of the first fluid connector (including 664 and 666) and second fluid connector (including 668 and 670) isolates the coolant in the loop.

Figure 6B:
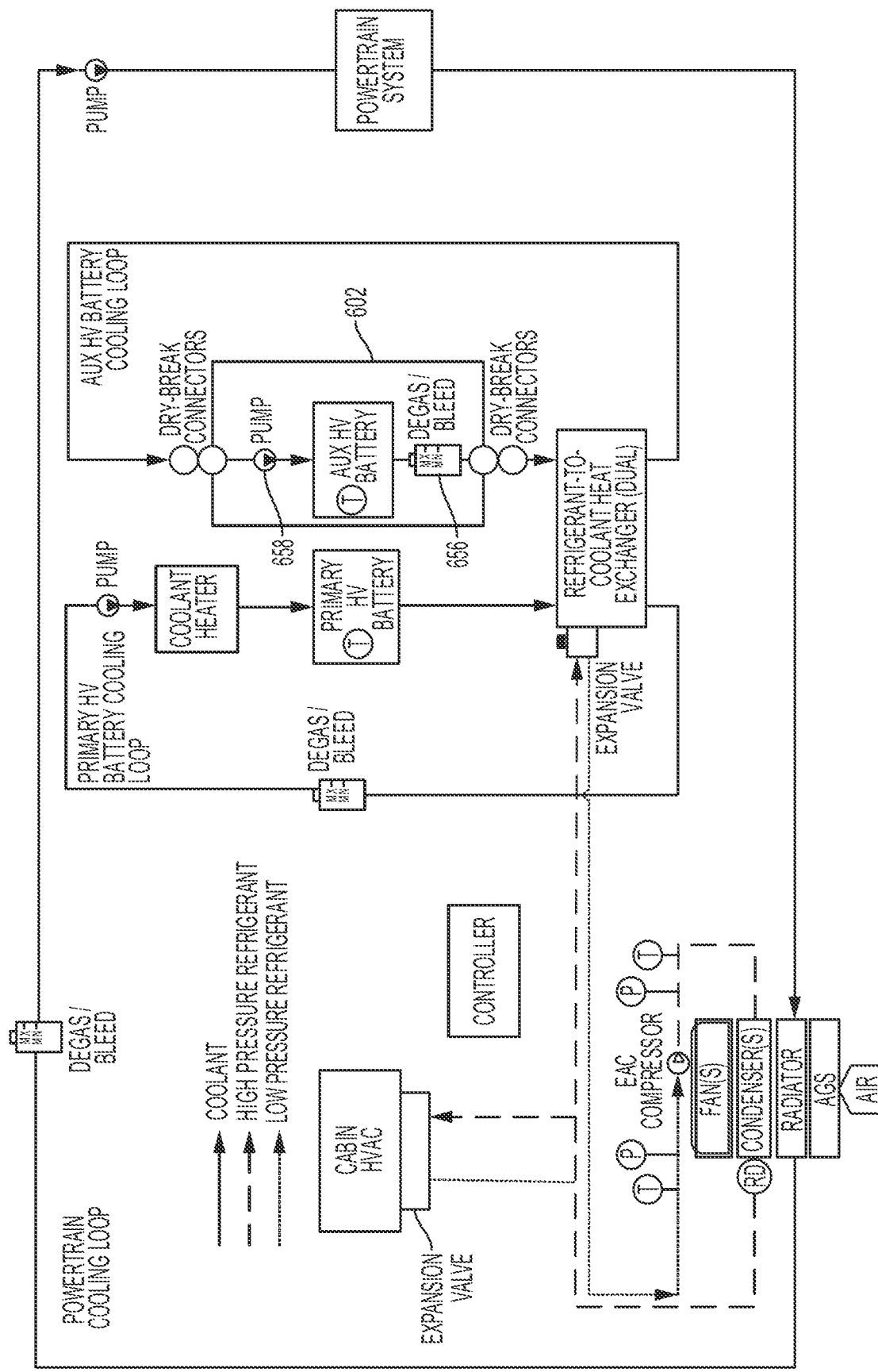

FIG. 6B illustrates another exemplary functional block diagram of a thermal management system for an electric vehicle having features previously described for electric vehicles 100 and 500 and including a primary battery 652, e.g., such as primary battery 552, and utilizing an auxiliary battery module 602 such as auxiliary battery modules 102, 202 and 502 as previously described herein, wherein both the auxiliary battery module 602 and primary battery 652 provide power to the vehicle powertrain for propelling the electric vehicle. The example of FIG. 6B differs from the example of FIG. 6A only in that the pump 658 and degas/bleed coolant reservoir 656 are located at the auxiliary battery module 602 instead of being located at the electric vehicle. Accordingly, the previous discussion of the common components and operation is not reproduced here.

Figure 6C:
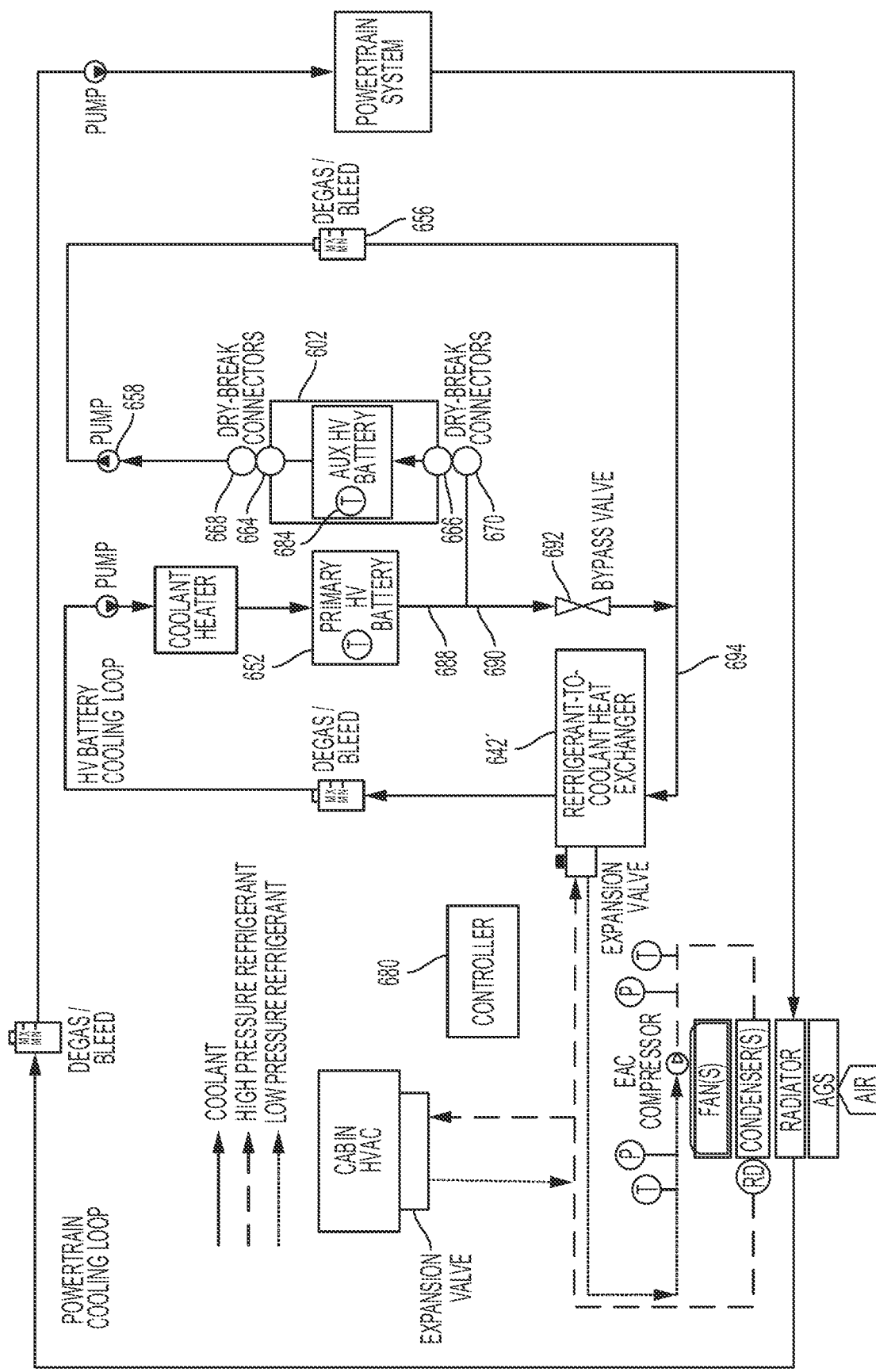

FIG. 6C illustrates another functional block diagram of an exemplary thermal management system for an electric vehicle having features previously described for electric vehicles 100 and 500 and including a primary battery 652, e.g., such as primary battery 552, and utilizing an auxiliary battery module 602 such as auxiliary battery modules 102, 202 and 502 as previously described herein, wherein both the auxiliary battery module 602 and primary battery 652 provide power to the vehicle powertrain for propelling the electric vehicle. Unlike the example of FIG. 6A, in which the primary battery 652 and the auxiliary battery module 602 are cooled via separate, parallel closed coolant loops (albeit sharing the same heat exchanger 642), in the example of FIG. 6C, the auxiliary battery module 602 is cooled via a single (i.e., the same) coolant loop as the primary battery 652. In this example, a portion 686 of the coolant line 634 that is connected to dry-break fluid connector 670 connects to a portion 688 of coolant line 634 via a tee-connection 690, and a bypass valve 692 is disposed between the tee-connection 690 and a portion 694 of cooling line 634 that connects to the heat exchanger 642'. Other aspects of the system are substantially similar to those of the example of FIG. 6A and are not described again here.

In operation of the system according to the example of FIG. 6C, when the auxiliary battery module 602 is disconnected from the electric vehicle, as detected by the controller 680, the controller 680 opens or maintains as open the bypass value 692. No isolation values are necessary to close off the auxiliary battery module 602 from the cooling loop, because disconnection of the first fluid connector (including 664 and 666) and second fluid connector (including 668 and 670) isolates the coolant in that portion of the cooling loop. In such a case, the thermal management system operates as previously described to monitor and control the temperature of the main battery 652 by controlling and adjusting any or all of the EAC compressor 628, pumps 636 and 658, fan 626, active grill shutter 614, expansion value 630, and coolant heater 638 to bring/maintain the temperature of the main battery 652 back to a within one or more permissible ranges. On the other hand, when the auxiliary battery module 602 is connected to the electric vehicle, as detected by the controller 680, the controller 680 closes or maintains as closed the bypass value 692, thereby forcing coolant through the auxiliary battery module 602 as well as through the main battery 652. In that case, the thermal management system operates such as previously described to monitor and control the temperature of the main battery 652 and the auxiliary battery module 602 by controlling or adjusting any or all of the EAC compressor 628, pumps 636 and 658, fan 626, active grill shutter 614, expansion value 630, and coolant heater 638 to bring/maintain the temperature of the respective battery 602 or 652 to values within one or more permissible ranges.

Figure 6D:
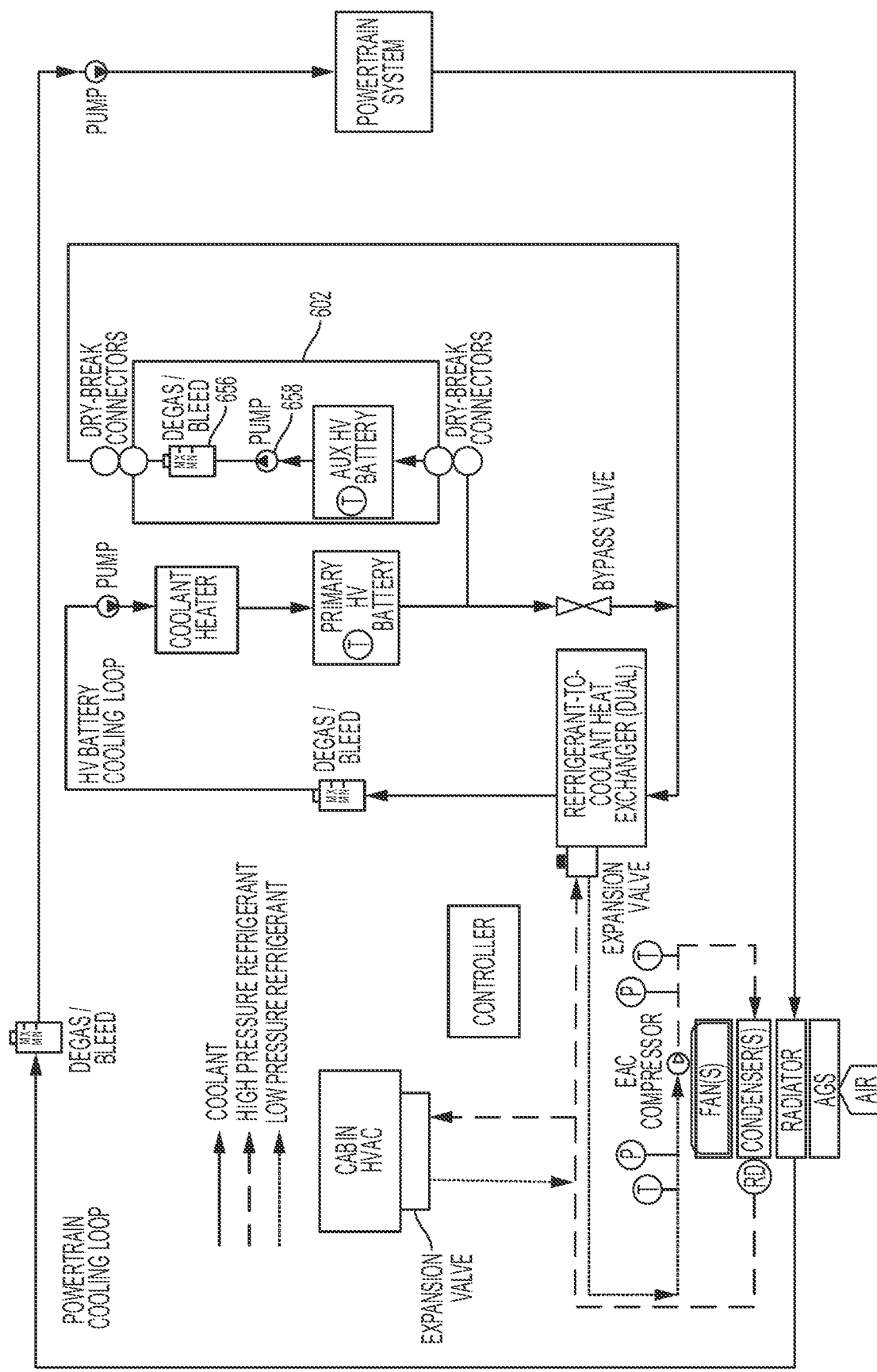

FIG. 6D illustrates another exemplary functional block diagram of a thermal management system for an electric vehicle having features previously described for electric vehicles 100 and 500 and including a primary battery 652, e.g., such primary battery 552, and utilizing an auxiliary battery module 602 such as auxiliary battery modules 102, 202 and 502 as previously described herein, wherein both the auxiliary battery module 602 and primary battery 652 provide power to the vehicle powertrain for propelling the electric vehicle. The example of FIG. 6D differs from the example of FIG. 6C only in that the pump 658 and degas/bleed coolant reservoir 656 are located at the auxiliary battery module 602 instead of being located at the electric vehicle. Accordingly, the previous discussion of the common components and operation is not reproduced here.

Figure 7A:
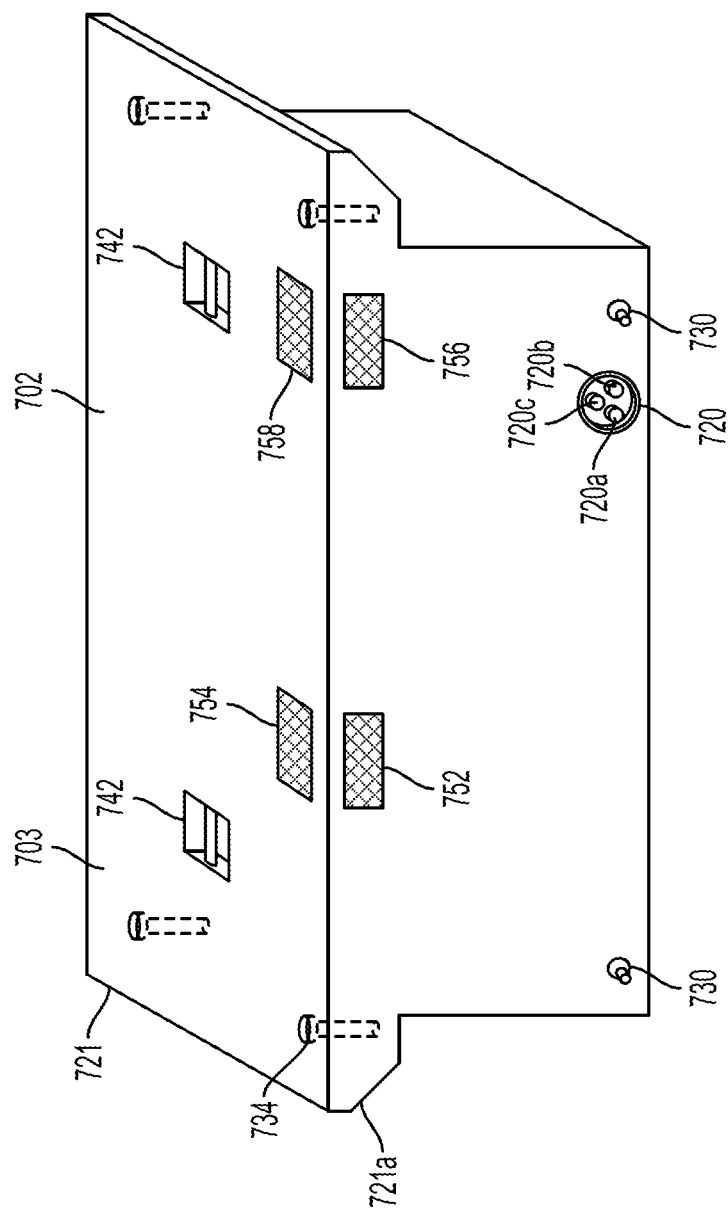
FIG. 7A illustrates an exemplary removable auxiliary battery module that can be removed from and reattached to an electric vehicle according with an integrated, independent cooling system to examples of the disclosure.

Another exemplary auxiliary battery module will now be described with reference to FIGS. 7A-7C and FIGS. 1A-3. As shown in FIG. 7A, an exemplary auxiliary battery module 702 includes a battery housing 703 and a battery diposed within the battery housing 703, wherein the battery comprises multiple individual battery cells (not shown). The auxiliary battery module 702 also includes a first electrical connector 720 mounted to the battery housing 703. The first electrical connector 720 mates to a second electrical connector 122 of the electric vehicle 100 of FIG. 1A such that the auxiliary battery module 702 can provide electrical power to the electric motor(s) that propel the electric vehicle 102, such as shown in FIGS. 1A, 5A and 5B, for example. The electrical connector 720 of FIG. 7A and electrical connector 122 of FIGS. 1A and 1B include high-voltage connections 720a, 720b and 122a, 122b, respectively, that permit the auxiliary battery module 702 to be electrically connected in parallel with the vehicle's primary battery and may include one or more low-voltage connections 720c and 122c, respectively, to provide electrical connection to sensors and electrical circuitry for monitoring and control associated with operation of the auxiliary battery module 702 when attached to the electric vehicle 100.

The auxiliary battery module 702 can be configured to be positioned in the cargo area 112 of the electric vehicle 100 such as previously described in connection with FIGS. 1A-1C and 3A-3C. In this regard, the auxiliary battery module 702 includes a battery housing 703 as noted above, protruding support portions 721, tapered support surfaces 721a, protruding alignment members 730, fastening holes 734 for bolts, and grab areas 742. In addition, the auxiliary battery module 702 includes air vents disposed in walls of the battery housing 703, e.g., inlet air vents 752 and 754 and outlet air vents 756 and 758, whose use will be further discussed below.

Figures 7B, 7C:
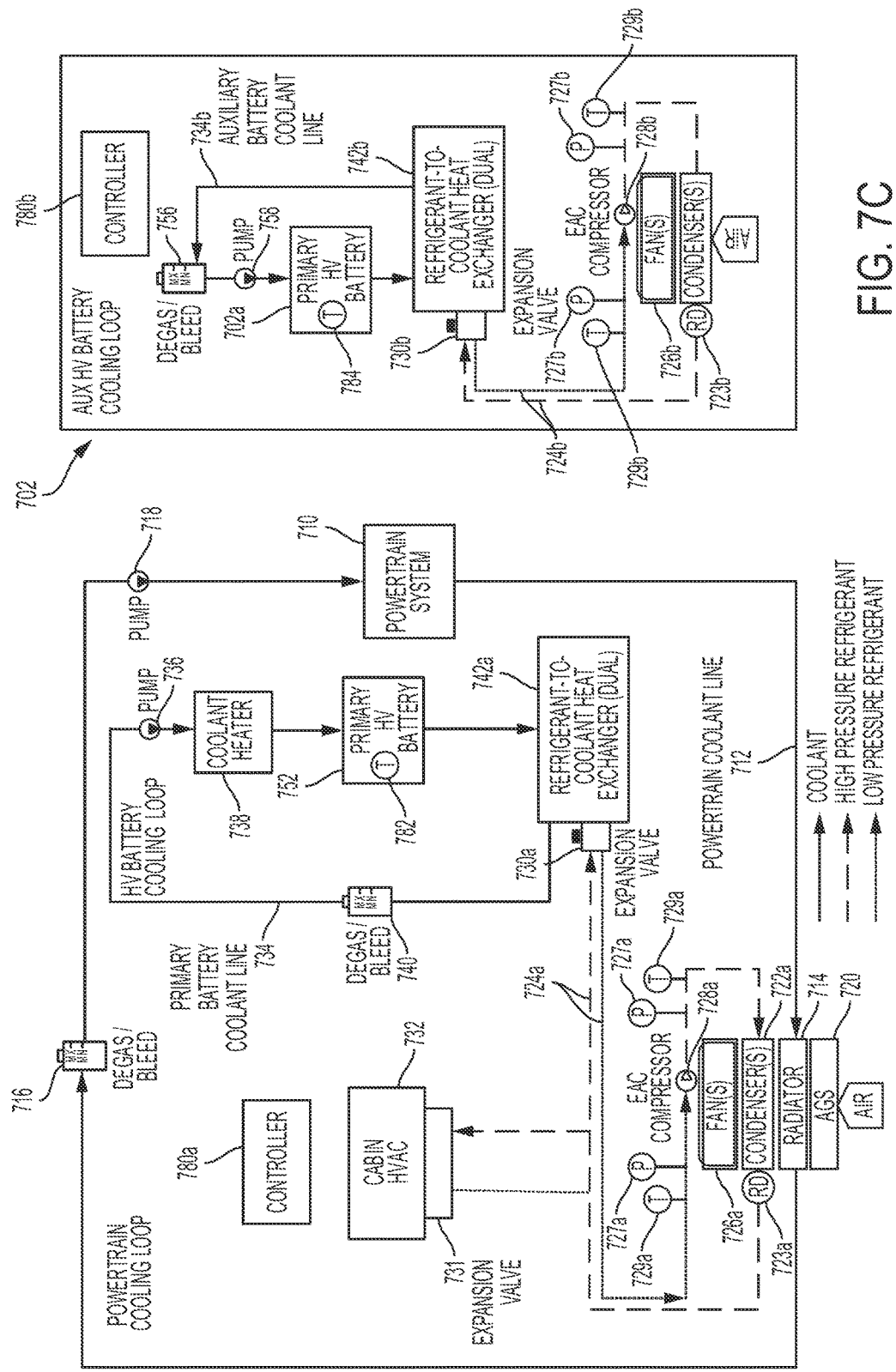
FIGS. 7B-7D illustrate block diagrams of exemplary thermal management systems for cooling a primary battery of an electric vehicle and an auxiliary battery module connected to the electric vehicle whose thermal management systems are separate and distinct according to examples of the disclosure.

FIG. 7B illustrates an exemplary functional block diagram of a thermal management system for an electric vehicle having features previously described for electric vehicles 100 and 500 and including a primary battery 762, e.g., such as primary battery 552, and utilizing an auxiliary battery module 702 mentioned above, wherein both the auxiliary battery module 702 and primary battery 762 provide power to the vehicle powertrain for propelling the electric vehicle. As shown in example of FIG. 7B, the electric vehicle comprises a powertrain system 710 (including one or more electric motors such as previously described), a powertrain coolant line 712 that passes through a radiator 714, and that is connected to a degas/bleed coolant reservoir 716, and that is further connected to a pump 718 for circulating coolant. The electric vehicle also includes an active grill shutter AGS 720 positioned adjacent to the radiator 714 and controlled by a motor or other suitable actuator. The vehicle also includes a refrigeration system including a condenser 722a, a receiver dryer (RD) 723 (e.g., comprising a desiccant to remove moisture), refrigerant lines 724a, a fan 726, an electric A/C compressor (EAC) 728a, and expansion valve 730a, which may be a thermal expansion valve with a solenoid or an electronic expansion valve. Pressure sensors 727a and temperature sensors 729a may be located at one or both refrigerant lines 724a at both sides of the EAC 728a to monitor/measure the pressure and temperature, respectively, of the refrigerant, e.g., for use in controlling the EAC 728a. The refrigerant system is also connected to a cabin HVAC module 732 via an expansion valve 731 and refrigerant lines 724a for providing cabin air conditioning.

In the example of FIG. 7B, the electric vehicle also includes a primary battery coolant line 734 (e.g., metal tubing such as copper alloy, aluminum alloy, steel alloy, etc.) that is connected to a coolant pump 736, a coolant heater 738, a degas/bleed coolant reservoir 740, a heat exchanger 742a (e.g., a refrigerant-to-coolant heat exchanger), and the primary battery 762. These components as connected by the primary battery coolant line 734a form a primary battery cooling loop. As shown in FIG. 7C, the cooling system for the auxiliary battery module 702 illustrated in FIG. 7C is separate and independent from the cooling system of the main battery 762 illustrated in FIG. 7B.

A controller 780a (that includes an onboard computer) at the electric vehicle, such as previously described herein, monitors a first temperature sensor 782 at the primary battery 762, and detects whether the temperature sensor 782 measures an out of range temperature condition (e.g., exceeds one or more upper threshold values or falls below one or more lower threshold values), and, if so, and can control and adjust (via electrical signals over electrical connection lines, not shown in FIG. 7B) any or all of the EAC compressor 728a, pump 736, fan 726a, active grill shutter 720, expansion value 730a, and coolant heater 738 to bring/maintain the temperature of the auxiliary battery 702a to a value within one or more permissible ranges.

As shown in FIG. 7C, the thermal management system of the auxiliary battery module 702 includes an auxiliary battery module coolant line 734b (e.g., metal tubing such as copper alloy, aluminum alloy, steel alloy, etc.) that is connected to a coolant pump 758, a degas/bleed coolant reservoir 756, a heat exchanger 742b (e.g., a refrigerant-to-coolant heat exchanger), and the auxiliary battery 702a (i.e., the arrangement of battery elements). These components as connected by the auxiliary battery coolant line 734b form an auxiliary battery module cooling loop that is separate and distinct from and independent of the primary battery cooling loop. As shown in FIG. 7C, the cooling system for the auxiliary battery module 702 illustrated in FIG. 7C is separate from and independent of the cooling system of the main battery 762 illustrated in FIG. 7B. The auxiliary battery module 702 in this example also includes a refrigeration system including a condenser 722b, a receiver dryer (RD) 723b, refrigerant lines 724b, a fan 726b, an electric A/C compressor (EAC) 728b, and an expansion valve 730b, which may be a thermal expansion valve with a solenoid or an electronic expansion valve. Pressure sensors 727b and temperature sensors 729b may be located at one or both refrigerant lines 724b at both sides of the EAC 728b to monitor/measure the pressure and temperature, respectively, of the refrigerant, e.g., for use in controlling the EAC 728b.

A controller 780b (that includes an onboard computer) at the auxiliary battery module 702 can monitor a temperature sensor 784 at the auxiliary battery module 702, and detects whether the temperature sensor 784 measures an out of range temperature condition (e.g., exceeds one or more upper threshold values or falls below one or more lower threshold values), and, if so, and can control and adjust (via electrical signals over electrical connection lines, not shown in FIG. 7C) any or all of the EAC compressor 728b, pump 758, fan 726b, and expansion value 730b to bring/maintain the temperature of the auxiliary battery 702a to a value within one or more permissible ranges. One or more fans 726b can direct air flow over the condenser 722b and through inlet air vents 752 and 754 and outlet air vents 756 and 758 shown in FIG. 7A.

Figure 7D:
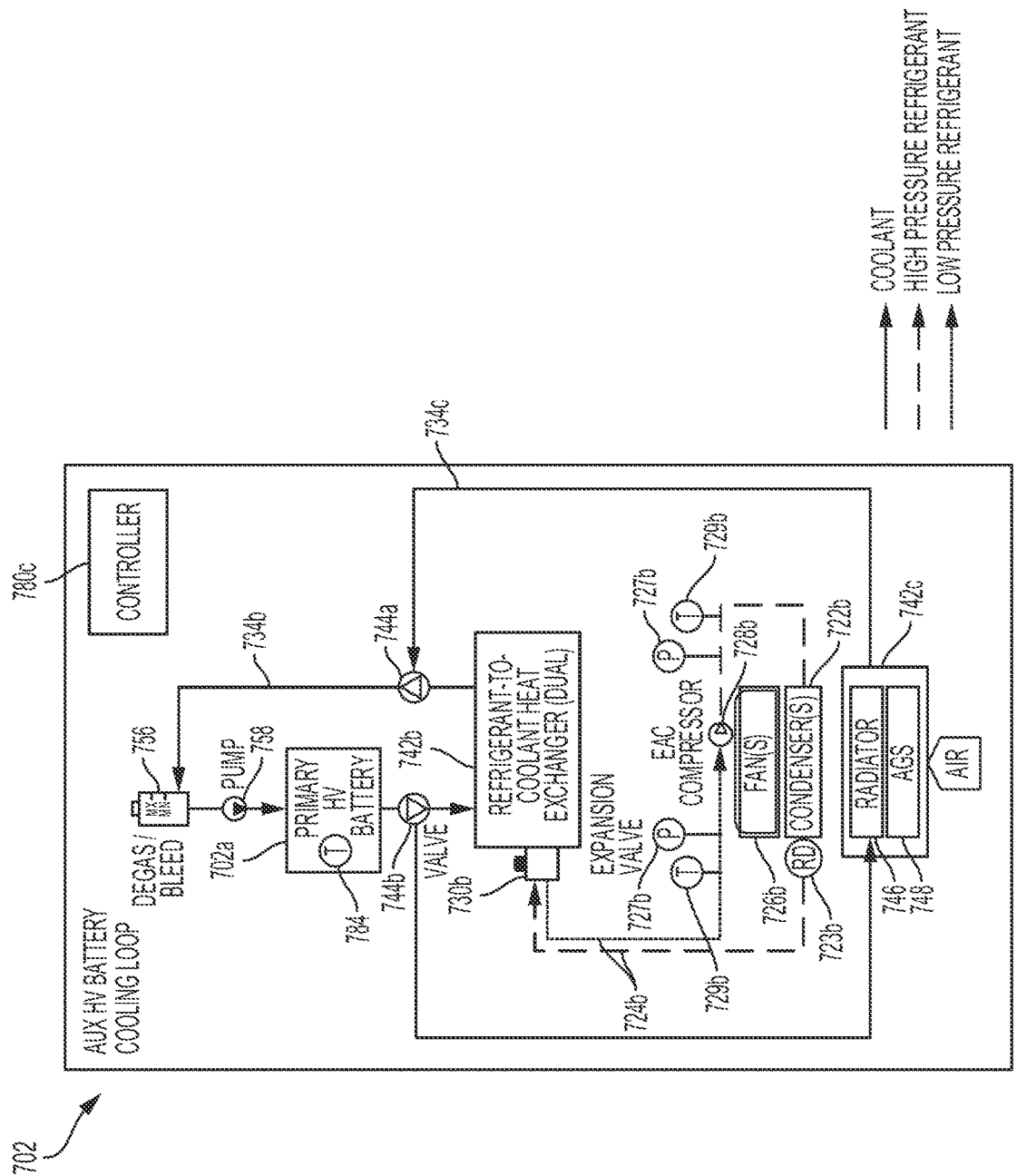

FIG. 7D illustrates a block diagram of a variation of the thermal management system of FIG. 7C of the auxiliary battery module 702. Whereas the thermal management system illustrated in FIG. 7C is shown as including one heat exchanger, which may be, e.g., a refrigerant-to-coolant heat exchanger or a coolant radiator without refrigerant lines, the exemplary system shown in FIG. 7D includes two heat exchangers, e.g., both a refrigerant-to-coolant heat exchanger and a coolant radiator without refrigerant lines in this example. Various components shown in FIG. 7D may be the same as those shown in FIG. 7C, and like reference numerals are used in FIG. 7D.

As shown in FIG. 7D, the exemplary thermal management system for the auxiliary battery module 702 includes a first auxiliary battery module coolant line 734b (e.g., metal tubing such as copper alloy, aluminum alloy, steel alloy, etc.) that is connected to a coolant pump 758, a degas/bleed coolant reservoir 756, a first heat exchanger 742b (e.g., a refrigerant-to-coolant heat exchanger), and the auxiliary battery 702a. These components as connected by the auxiliary battery coolant line 734b form an auxiliary battery module cooling loop that is separate and distinct from and independent of the primary battery cooling loop. As shown in FIG. 7D, the cooling system for the auxiliary battery module 702 illustrated in FIG. 7D is separate from and independent of the cooling system of the main battery 762 illustrated in FIG. 7B. The auxiliary battery module 702 in this example also includes a refrigeration system including a condenser 722b, a receiver dryer (RD) 723b, refrigerant lines 724b, a fan 726b, an electric A/C compressor (EAC) 728b, and an expansion valve 730b, which may be a thermal expansion valve with a solenoid or an electronic expansion valve, so as to provide cooling via a refrigerant for the first heat exchanger 742b. Pressure sensors 727b and temperature sensors 729b may be located at one or both refrigerant lines 724b at both sides of the EAC 728b to monitor/measure the pressure and temperature, respectively, of the refrigerant, e.g., for use in controlling the EAC 728b.

The exemplary thermal management system shown in FIG. 7D for the auxiliary battery module 702 also includes a second auxiliary battery module coolant line 734c (e.g., metal tubing such as copper alloy, aluminum alloy, steel alloy, etc.) that is connected to the first auxiliary battery module coolant line 734b via bypass valves 744a and 744b and which is connected to a second heat exchanger 742c, e.g., in the form of a radiator 746 and an active grill shutter (AGS) 748 in this example and which utilizes fan(s) 726b. The bypass valves 744a and 744b can be actuated under control of a controller 780c to invoke battery cooling either using the first heat exchanger 742b or the second heat exchanger 742c.

For example, when the ambient outside temperature measured by a temperature sensor in communication with the controller 780c is above a first threshold temperature (e.g., a high temperature such as 90° F., 95° F., 100° F., etc.), the controller 780c can control the bypass values 744a and 744b to route coolant through the first auxiliary coolant line 734b to the first heat exchanger 742b so as to permit refrigerant cooled by compressor 728b to cool the coolant destined for cooling the auxiliary battery 702a and to bypass the second heat exchanger 742c. For example, if the outside ambient temperature is 115° F., refrigerant cooling may be needed to adequately cool the auxiliary battery 702a, and the controller 780c therefore controls the bypass valves 744a and 744b accordingly.

When the ambient outside temperature measured by a temperature sensor in communication with the controller 780c is below the first threshold temperature, the controller 780c can control the bypass valves 744a and 744b to bypass the first heat exchanger 742b and route coolant from the first auxiliary coolant line 734b to the second auxiliary coolant line 734c to direct coolant through the second heat exchanger 742c so as to permit coolant cooled by radiator 746, AGS 748 and fan(s) 726b to cool the coolant destined for cooling the auxiliary battery 702a. For example, if the outside ambient temperature is 65° F., refrigerant cooling may not be needed to adequately cool the auxiliary battery 702a since cooling by the radiator 746 via ambient outside air may be sufficient, and the controller 780c therefore controls the bypass valves 744a and 744b accordingly. The components connected by the first auxiliary battery coolant line 734b and second auxiliary battery coolant line 734c, bypassing the first heat exchanger 742b and refrigerant system components, form an auxiliary battery module cooling loop that is separate and distinct from and independent of the primary battery cooling loop.

The controller 780c (that includes an onboard computer) at the auxiliary battery module 702 can monitor a temperature sensor 784 at the auxiliary battery module 702, and detects whether the temperature sensor 784 measures an out of range temperature condition (e.g., exceeds one or more upper threshold values or falls below one or more lower threshold values), and, if so, and can control and adjust (via electrical signals over electrical connection lines, not shown in FIG. 7D) any or all of the bypass valves 744a and 744b, the EAC compressor 728b, pump 758, fan(s) 726b, expansion value 730b, and AGS 748 to bring/maintain the temperature of the auxiliary battery 702a to a value within one or more permissible ranges. One or more fans 726b can direct air flow over the condenser 722b and/or over radiator 746 and AGS 748 through inlet air vents 752 and 754 and outlet air vents 756 and 758 shown in FIG. 7A.

Additional aspects of the disclosure are now described that are applicable to all of the examples previously described herein. As described above, the first electrical connector of the auxiliary battery module provides electrical power to the electric vehicle, and the first electrical connector may also be used to charge the auxiliary battery module, e.g., using a high-voltage battery charger. In addition, the controller, which can monitor the temperature of the primary battery and the temperature of the auxiliary battery module using respective temperature sensors, can carry out such temperature monitoring when the electric vehicle is not in use and may initiate cooling of the primary battery and/or the auxiliary battery module even when the vehicle is not in use, so as to prevent battery degradation from extreme outside environmental temperatures that may be experienced by the electric vehicle and auxiliary battery module.

In addition, in exemplary aspects, the auxiliary battery module may include one or more sensor pairing devices to detect proper placement and attachment of the auxiliary battery module, e.g., one or more interlock switch devices, an electronic chip, a radio frequency identification (RFID) chip, a magnet structure of a particular configuration, etc., and the electric vehicle 500 may include one or more associated sensors to detect or otherwise communicate with the sensor pairing device of auxiliary battery module. Such auxiliary battery modules may have unique identification numbers associated with them, those unique identification numbers may be detected using such sensing means. In examples, such sensing devices may be coupled to Bluetooth transceivers or other wireless devices that establish communication so as to permit the sensing devices to receive or generate a signal a signal that permits the controller (via the onboard computer included therewith) to monitor parameters of the auxiliary battery module, such as its temperature via a temperature sensor or voltage via voltage detection circuitry. In addition, wireless transceivers disposed at (e.g., in or on) the auxiliary battery module may pair and communicate not only with the onboard controller, but also with mobile computing devices such as smart phones, tablets, and other portable computerized devices, to provide diagnostics and information about the auxiliary battery module, e.g., to fleet technicians.

In some examples, when one or more auxiliary battery modules is attached to the electric vehicle, the vehicle's controller (with onboard computer system) may automatically identify characteristics of the auxiliary battery modules, e.g., weight and weight distribution, based on how many auxiliary battery modules are attached and based on the size and weight of those modules, e.g., given pretabulated information on those quantities based on a model number or unique identification number of the auxiliary battery module(s). The controller may then set a predetermined feature set for the electric vehicle based on the electric vehicle 500 being equipped with the auxiliary battery module(s). In examples, the predetermined feature set may comprise one or more ride performance characteristics including one or more of a limitation on a maximum permissible acceleration, a firmness of ride of the vehicle, braking performance/sensitivity, a nominal suspension height, and an effective steering ratio, and onboard computer 554 may select appropriate vehicle driving performance characteristics suitable for the vehicle configuration, such as placing a limitation on a maximum permissible acceleration, a firmness of ride of the vehicle, braking performance/sensitivity, a nominal suspension height, and an effective steering ratio.

The onboard computer of controller may include a computer processing system (one or more CPUs) and a non-transitory computer readable memory coupled to the processing system, wherein the processing system may be programmed to receive data signals and make decisions as described herein. In addition, application specific integrated circuits (ASIC) may be utilized to execute control functions described herein based on sensor measurements, e.g., such as temperature measurements, as described herein. The onboard computer of the controller may also include element managers, real-time data buffers, conveyors, file input processors, database indices, data buffers and data managers for managing data and processing. The onboard computer of the controller may execute software program instructions including source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply. In addition, as used in the description herein and throughout the claims that follow, the meaning of "about" and/or "approximately" refers to ±10% of the quantity indicated, unless otherwise indicated.

While the present invention has been described in terms of exemplary embodiments, it will be understood by those skilled in the art that various modifications can be made thereto without departing from the scope of the invention as set forth in the claims.

What is claimed is:

1. An electric vehicle system for transporting human passengers or cargo, the electric vehicle system comprising:
    an electric vehicle comprising a body, a plurality of wheels, a cargo area, an electric motor for propelling the electric vehicle, and a primary battery for providing electrical power to the electric motor for propelling the electric vehicle; and
    an auxiliary battery module that is attachable to the electric vehicle for providing electrical power to the electric motor via a first electrical connector at the auxiliary battery module and a second electrical connector at the electric vehicle that mates with the first electrical connector,
    the auxiliary battery module being configured to be positioned in the cargo area while supplying power to the electric motor,
    the auxiliary battery module being configured to be removable from and reattachable to the electric vehicle,
    the auxiliary battery module including an integrated cooling system for cooling the auxiliary battery module during operation of the electric vehicle, the integrated cooling system comprising a conduit for circulating coolant within the auxiliary battery module, and
    wherein the conduit of the integrated cooling system of the auxiliary battery module is unconnected to a cooling system for cooling the primary battery of the electric vehicle.

2. The electric vehicle system of claim 1, wherein the conduit of the integrated cooling system of the auxiliary battery module comprises a closed coolant loop comprising a coolant line, a coolant pump configured to circulate coolant through the coolant line within the auxiliary battery module, and a degas or bleed coolant reservoir.

3. The electric vehicle system of claim 1, wherein the conduit of the integrated cooling system of the auxiliary battery module comprises a closed coolant loop comprising a coolant line, a coolant pump configured to circulate coolant through the coolant line within the auxiliary battery module.

4. The electric vehicle system of claim 2, wherein the integrated cooling system of the auxiliary battery comprises a refrigerant system configured to deliver refrigerant to a heat exchanger in the electric vehicle to cool the coolant in the coolant line.

5. An auxiliary battery module for providing electrical power to a powertrain of an electric vehicle for transporting human passengers or cargo, the auxiliary battery module comprising:
- a battery housing;
- a battery disposed in the battery housing;
- support portions at the battery housing configured to securely mount the battery housing of the auxiliary battery module to support members of an electric vehicle at a cargo area of the electric vehicle using releasable fasteners or latching mechanisms to permit the auxiliary battery module to be removed from and reattached to the electric vehicle;
- a first electrical connector at the battery housing and electrically connected to the battery disposed in the battery housing, the first electrical connector configured to mate with a corresponding second electrical connector at the electric vehicle to permit the auxiliary battery module to power a powertrain of the electric vehicle to propel the electric vehicle; and
- an integrated cooling system inside the battery housing for cooling the auxiliary battery module during operation of the electric vehicle, the integrated cooling system comprising a conduit for circulating coolant within the auxiliary battery module,
- wherein the conduit of the integrated coolant system is unconnected to a conduit of a cooling system for cooling a primary battery of the electric vehicle.

6. The auxiliary battery module of claim 5, wherein the conduit of the integrated cooling system of the auxiliary battery module comprises a closed coolant loop comprising a coolant line, a coolant pump configured to circulate coolant though the coolant line within the auxiliary battery module, and a degas or bleed coolant reservoir.

7. The auxiliary battery module of claim 5, wherein the conduit of the integrated cooling system of the auxiliary battery module comprises a closed coolant loop comprising a coolant line, a coolant pump configured to circulate coolant though the coolant line within the auxiliary battery module.

8. The auxiliary battery module of claim 7, wherein the integrated cooling system of the auxiliary battery comprises a refrigerant system configured to deliver refrigerant to a heat exchanger in the electric vehicle to cool the coolant in the coolant line.

9. The electric vehicle system of claim 1, wherein the auxiliary battery module comprises a plurality of dry break connectors configured to connect the conduit of the integrated cooling system to a heat exchanger in the electric vehicle.

10. The electric vehicle system of claim 3, wherein the closed coolant loop is disposed in the electric vehicle.

11. The auxiliary battery module of claim 5, further comprising a plurality of dry break connectors configured to connect the conduit of the integrated cooling system to a heat exchanger in the electric vehicle.

* * * * *